(12) United States Patent
Zhao

(10) Patent No.: US 11,323,211 B2
(45) Date of Patent: May 3, 2022

(54) PHYSICAL LAYER RESOURCE MAPPING METHOD AND DEVICE, USER EQUIPMENT AND BASE STATION

(71) Applicant: BEIJING XIAOMI MOBILE SOFTWARE CO., LTD., Beijing (CN)

(72) Inventor: Qun Zhao, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 178 days.

(21) Appl. No.: 16/871,384

(22) Filed: May 11, 2020

(65) Prior Publication Data
US 2020/0274655 A1 Aug. 27, 2020

Related U.S. Application Data

(63) Continuation of application No. PCT/CN2017/111350, filed on Nov. 16, 2017.

(51) Int. Cl.
*H04L 1/18* (2006.01)
*H04L 5/00* (2006.01)
*H04W 72/04* (2009.01)

(52) U.S. Cl.
CPC .......... *H04L 1/1861* (2013.01); *H04L 1/1812* (2013.01); *H04L 5/0007* (2013.01); *H04L 5/0055* (2013.01); *H04W 72/0413* (2013.01)

(58) Field of Classification Search
CPC ... H04L 1/1861; H04L 1/1812; H04L 5/0007; H04L 5/0055; H04L 27/2613; H04W 72/0413
See application file for complete search history.

(56) References Cited

U.S. PATENT DOCUMENTS

| 2010/0195629 A1 | 8/2010 | Chen et al. |
| 2013/0003526 A1 | 1/2013 | Novak |
| 2017/0041923 A1 | 2/2017 | Park |

(Continued)

FOREIGN PATENT DOCUMENTS

| CN | 103414679 A | 11/2013 |
| CN | 104935415 A | 9/2015 |

(Continued)

OTHER PUBLICATIONS

Second Office Action of the Korean application No. 10-2020-7017062, dated Nov. 30, 2021, (10 pages).

(Continued)

*Primary Examiner* — Vinncelas Louis
(74) *Attorney, Agent, or Firm* — Arch & Lake LLP

(57) ABSTRACT

Provided are physical-layer resource mapping methods and devices, UE and a base station. The method includes: during multiplexing transmission of hybrid automatic repeat request acknowledgement (HARQ ACK) information and uplink data, determining a starting position and frequency-domain offset of an HARQ-ACK modulation symbols mapped to a physical-layer resource, the frequency-domain offset being each of frequency-domain offsets of resource elements (REs) that different HARQ-ACK modulation symbols are mapped to; and mapping each HARQ-ACK modulation symbol to the corresponding RE according to the starting position and the frequency-domain offset.

18 Claims, 16 Drawing Sheets

---

In response to hybrid automatic repeat request acknowledgement (HARQ-ACK) information and uplink data being multiplexed in transmission, a frequency-domain offset and a starting position for each of physical-layer resources that a HARQ-ACK modulation symbol is mapped to are determined — 101

Each HARQ-ACK modulation symbol is mapped to a corresponding RE according to the starting position and the frequency-domain offset — 102

(56) References Cited

U.S. PATENT DOCUMENTS

| | | | |
|---|---|---|---|
| 2017/0318575 | A1 | 11/2017 | Park et al. |
| 2019/0081660 | A1* | 3/2019 | Han .................... H04L 27/2613 |
| 2019/0173622 | A1* | 6/2019 | Xiong .................. H04L 1/1861 |
| 2020/0252928 | A1 | 8/2020 | Park et al. |

FOREIGN PATENT DOCUMENTS

| | | | |
|---|---|---|---|
| CN | 105144618 | A | 12/2015 |
| CN | 106712894 | A | 5/2017 |
| CN | 106961408 | A | 7/2017 |
| CN | 106961744 | A | 7/2017 |
| CN | 107027181 | A | 8/2017 |
| CN | 107332646 | A | 11/2017 |
| EP | 3232595 | A1 | 10/2017 |
| EP | 3281331 | A1 | 2/2018 |
| EP | 3331185 | A1 | 6/2018 |
| JP | 2012520000 | A | 8/2012 |
| KR | 20170093107 | A | 8/2017 |
| RU | 2492577 | C2 | 9/2013 |
| WO | 2009135194 | A2 | 11/2009 |
| WO | 2013112972 | A1 | 8/2013 |
| WO | 2014021753 | A2 | 2/2014 |
| WO | 2014111495 | A1 | 7/2014 |
| WO | 2016163941 | A1 | 10/2016 |

OTHER PUBLICATIONS

First Office Action of the Japanese Application No. 2020-526581, dated Jun. 29, 2021 with English translation, (13p).
First Office Action of the Korean Application No. 10-2020-7017062, dated Apr. 30, 2021 with English translation, (15p).
CATT, "Multiplexing of UCI and UL data on PUSCH", 3GPP TSG RAN WG1 #90bis, 3GPP, R1-1717831, server publication date Oct. 3, 2017, (5p).
LG Electronics, "Summary of proposals on CBG based retransmission", 3GPP TSG RAN WG1 #90bis, R1-1718861, server publication date Oct. 9, 2019, (9p).
Qualcomm Incorporated, "Summary of remaining issues for UCI multiplexing on PUSCH", 3GPP TSG RAN WG1 #AH, R1-1716853, server publication date Sep. 20, 2017, (3p).
International Search Report and Written Opinion of International Application No. PCT/CN2017/111350, dated Aug. 9, 2018 with English translation, (5p).
First Office Action of the Chinese Application No. 201780001947.6, dated Apr. 1, 2019 with English translation (19p).
Notification to Grant Patent of the Chinese Application No. 201780001947.6, dated Feb. 20, 2020 (4p).
First Office Action of the Russian Application No. 2020119086, dated Sep. 9, 2020 with English translation, (18p).
First Office Action of the Chinese Application No. 202010236991.9, dated Oct. 9, 2020 with English translation (10p).
Extended European Search Report in the European Application No. 17932362.1, dated Oct. 27, 2020, (12p).
CATT, "Multiplexing of UCI and UL data on PUSCH", 3GPP Draft; R1-1712407, 3rd Generation Partnership Project (3GPP), Mobilecompetence Centre ; 650, Route Des Lucioles: F-06921 Sophia-Antipolis Cedex France vol. RAN WG1, No. Prague, Czechia: Aug. 21, 2017-Aug. 25, 2017, Aug. 20, 2017 Retrieved from the Internet.
Samsung, "Performance Results for UCI and Data Multiplexing", 3GPP Draft: R1-1717658 Performance Resultsfor UCI and Data Multiplexing—Samsung, 3rd Generation Partnership Project (3GPP), Mobile Competence Centre : 650, Route Des Lucioles : F-06921 Sophia-Antipol vol. RAN WG1, No. Prague, CZ; Oct. 9, 2017-Oct. 13, 2017 Oct. 8, 2017, Retrieved from the Internet.
Samsung, "Resource Allocation for PUCCH Format 1b with Channel Selection in TDD" 3GPP TSG RAN WG1 #68, R1-120156, Dresden, Germany, Feb. 6, 2012, (6p).
Office Action of the Indian Application No. 202047024840, dated Jul. 31, 2021, (5p).

\* cited by examiner

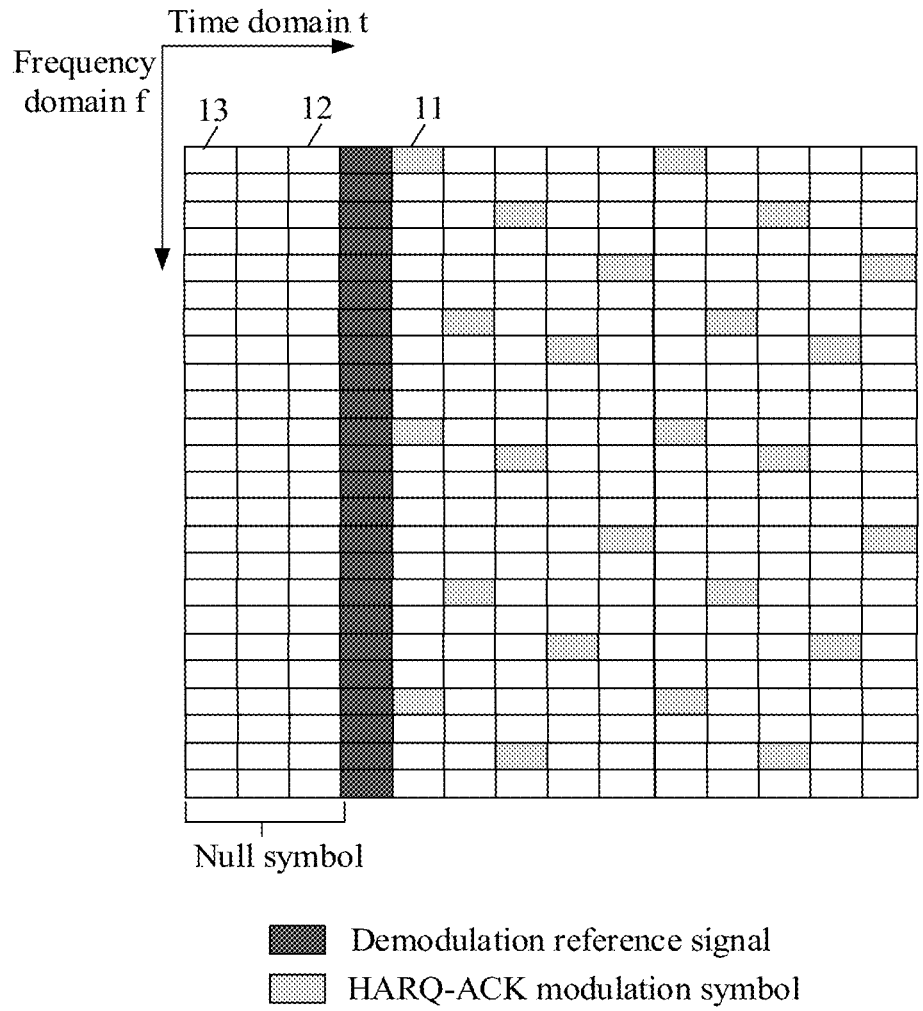

FIG. 1C a starting position of a physical-layer resource that each HARQ-ACK modulation symbol is mapped to is determined, and a frequency-domain offset is determined based on the number N of OFDM symbols mappable for the HARQ-ACK modulation symbols, the number K of REs occupied by the HARQ-ACK modulation symbols and the number M of REs in each OFDM symbol — 201

A first HARQ-ACK modulation symbol is mapped to an RE where the starting position is — 202

FIG. 2A

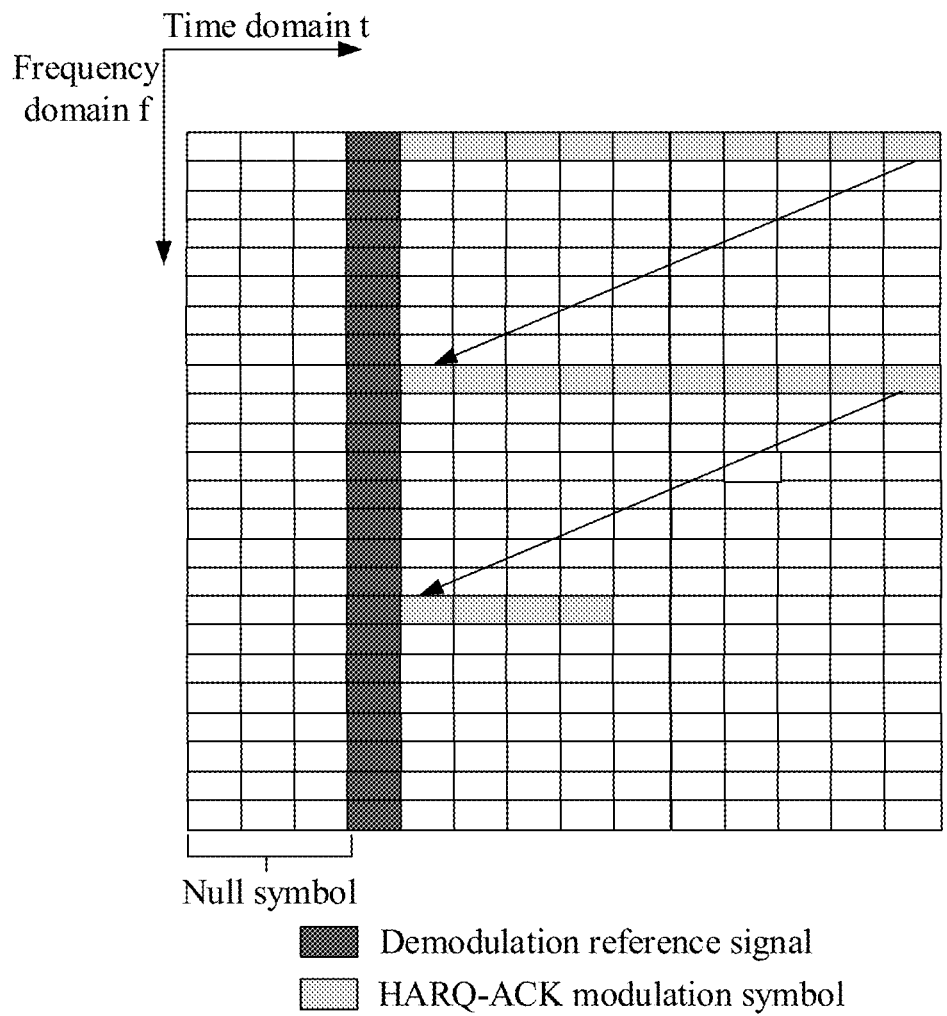

FIG. 3B

| A starting position of each of a plurality of physical-layer resources that a HARQ-ACK modulation symbol is mapped to is determined, and a frequency-domain offset is determined based on the number K of REs occupied by the HARQ-ACK modulation symbols and the number M of REs in each OFDM symbol | 401 |

| Q HARQ-ACK modulation symbols are mapped, from a RE where the starting position is, to different REs with the same frequency-domain position in a time-domain-first manner, and then are subjected to offsetting based on the frequency-domain offset, and then next Q HARQ-ACK modulation symbols are mapped to different REs, Q being calculated based on K and M | 402 |

FIG. 4A

PHYSICAL LAYER RESOURCE MAPPING METHOD AND DEVICE, USER EQUIPMENT AND BASE STATION

CROSS-REFERENCE TO RELATED APPLICATION

This application is a continuation of International Application No. PCT/CN2017/111350 filed on Nov. 16, 2017, the content of which is hereby incorporated by reference in its entirety.

TECHNICAL FIELD

The present disclosure generally relates to the technical field of communications, and more particularly, to a physical-layer resource mapping method and device, user equipment (UE) and a base station.

BACKGROUND

In a Long Term Evolution (LTE) system, when transmission of uplink data and transmission of uplink control information of UE overlap in a time domain, uplink control information to be transmitted may be determined as part of uplink data to be transmitted, and time-domain and frequency-domain resources for transmission of uplink data may be multiplexed to transmit the uplink control information. In LTE, during multiplexing transmission of uplink hybrid automatic repeat request acknowledgement (HARQ ACK) information and uplink data, HARQ-ACK modulation symbols may be mapped to four orthogonal frequency division multiplexing (OFDM) symbols next to symbols where two demodulation reference signals (DMRSs) are located, and may be mapped to corresponding resource elements (REs) in a time domain and then in a frequency domain from low to high.

In researches and discussions about the 5th Generation (5G) project, REs for uplink data are mapped in a frequency-domain-first manner and the concept of Code Block Group (CBG) is introduced. Therefore, in a new-generation network, for example, a 5G network, a resource mapping manner in LTE, which is a manner of multiplexing for HARQ-ACK modulation symbols and uplink data, may cause such a condition that REs for data of the HARQ-ACK modulation symbols may belong to data of the same Code Block (CB) and a receiver may take the data in the CB as an error code, which may degrade performance of uplink data transmission.

SUMMARY

For solving the problem in related arts, embodiments of the present disclosure provide physical-layer resource mapping methods and devices, UE and a base station, to evenly distribute HARQ-ACK modulation symbols on as many OFDM symbols as possible in a frequency domain during multiplexing transmission of the HARQ-ACK modulation symbols and uplink data to avoid uplink data transmission performance reduction caused by concentrated distribution of the HARQ-ACK modulation symbols on one or more OFDM symbols.

According to a first aspect of the present disclosure, a physical-layer resource mapping method may be applied to UE and may include: during multiplexing transmission of hybrid automatic repeat request acknowledgement (HARQ-ACK) information and uplink data, determining a frequency-domain offset and a starting position for each of physical-layer resources that a HARQ-ACK modulation symbol is mapped to, the frequency-domain offset being for identifying one of a plurality of resource elements (REs) that different HARQ-ACK modulation symbols are mapped to; and mapping each HARQ-ACK modulation symbol to a corresponding RE according to the starting position and the frequency-domain offset.

According to a second aspect of the present disclosure, a physical-layer resource mapping method may be applied to a base station and may include: receiving coded data from UE, the coded data including HARQ-ACK modulation symbols and data modulation symbols; determining resource elements (REs) including the HARQ-ACK modulation symbols and REs including the data modulation symbols based on a starting position and a frequency-domain offset for each of physical-layer resources that a HARQ-ACK modulation symbol is mapped to, the frequency-domain offset being for identifying one of a plurality of REs that different HARQ-ACK modulation symbols are mapped to; and acquiring HARQ-ACK information and uplink data based on the REs including the HARQ-ACK modulation symbols and the REs including the data modulation symbols.

According to a third aspect of the present disclosure, UE is provided, which may include: a processor; and a memory configured to store instructions executable by the processor. The processor may be configured to: during multiplexing transmission of hybrid automatic repeat request acknowledgement (HARQ-ACK) information and uplink data, determine a frequency-domain offset and a starting position for each of physical-layer resources that a HARQ-ACK modulation symbol is mapped to, the frequency-domain offset being for identifying one of a plurality of resource elements (REs) that different HARQ-ACK modulation symbols are mapped to; and map each HARQ-ACK modulation symbol to a corresponding REs according to the starting position and the frequency-domain offset.

According to a fourth aspect of the present disclosure, a base station is provided, which may include: a processor; and a memory configured to store instructions executable by the processor. The processor may be configured to: receive coded data from UE, the coded data including HARQ-ACK modulation symbols and data modulation symbols; determine REs including the HARQ-ACK modulation symbols and REs including the data modulation symbols based on a starting position and a frequency-domain offset for each of physical-layer resources that each HARQ-ACK modulation symbol is mapped to, wherein the frequency-domain offset being for one of REs that different HARQ-ACK modulation symbols are mapped to; and acquire HARQ-ACK information and uplink data based on the REs including the HARQ-ACK modulation symbols and the REs including the data modulation symbols.

According to a fifth aspect of the present disclosure, a non-transitory computer-readable storage medium is provided, in which computer instructions may be stored, the instructions being executed by a processor to implement acts including: during multiplexing transmission of hybrid automatic repeat request acknowledgement (HARQ-ACK) information and uplink data, determining a frequency-domain offset and a starting position for each of physical-layer resources that a HARQ-ACK modulation symbol is mapped to, the frequency-domain offset being for identifying one of a plurality of resource elements (REs) that different HARQ-ACK modulation symbols are mapped to; and mapping each HARQ-ACK modulation symbol to a corresponding RE according to the starting position and the frequency-domain offset.

According to a sixth aspect of the present disclosure, a non-transitory computer-readable storage medium is provided, in which computer instructions may be stored, the instructions being executed by a processor to implement acts including: receiving coded data from UE, the coded data including HARQ-ACK modulation symbols and data modulation symbols; determining resource elements (REs) comprising the HARQ-ACK modulation symbols and REs comprising the data modulation symbols based on a starting position and frequency-domain offset for each of physical-layer resources that a HARQ-ACK modulation symbol is mapped to, the frequency-domain offset being for identifying one of a plurality of resource elements (REs) that different HARQ-ACK modulation symbols are mapped to; and acquiring HARQ-ACK information and uplink data based on the REs comprising the HARQ-ACK modulation symbols and the REs including the data modulation symbols.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1C is a first schematic diagram illustrating physical-layer resource mapping according to an example.

FIG. 2A is a flowchart showing another physical-layer resource mapping method according to an example.

FIG. 3B is a third schematic diagram illustrating physical-layer resource mapping according to an example.

FIG. 4A is a flowchart showing another physical-layer resource mapping method according to an example.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

The technical solutions provided by embodiments of the present disclosure may have beneficial effects. When UE needs to simultaneously send HARQ-ACK information and uplink data, a starting position and frequency-domain offset for each of physical-layer resources that a HARQ-ACK modulation symbol is mapped to may be determined, and each HARQ-ACK modulation symbol may be uniformly distributed to as many OFDM symbols as possible in a frequency domain based on the frequency-domain offset, so that uplink data transmission performance reduction caused by concentrated distribution of the HARQ-ACK modulation symbols on one or more OFDM symbols can be avoided.

Figure 1A:
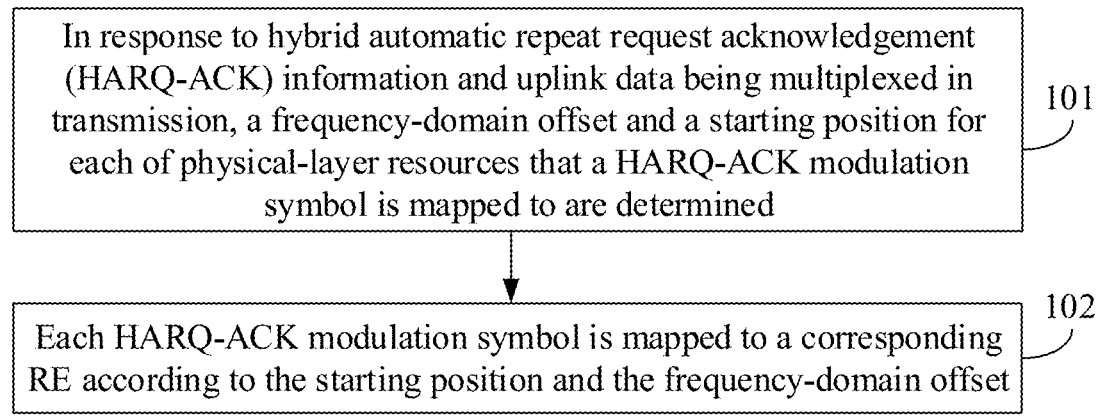
FIG. 1A is a flowchart showing a physical-layer resource mapping method according to an example.
Figure 1B:
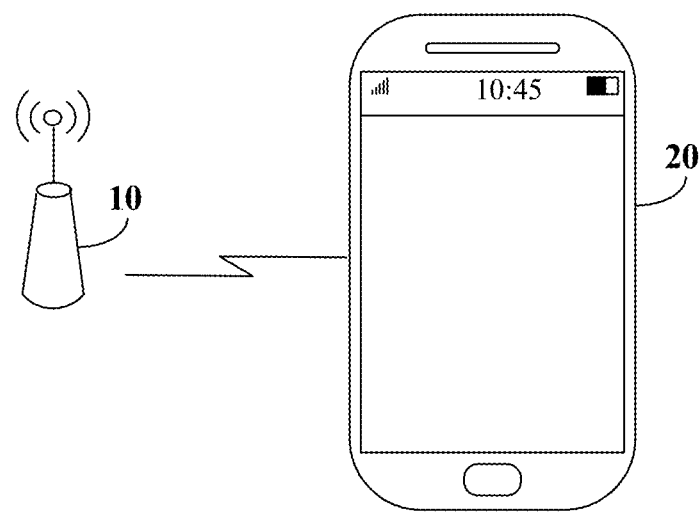
FIG. 1B is a scenario diagram of a physical-layer resource mapping method according to an example.

FIG. 1A is a flowchart showing a physical-layer resource mapping method according to an example. FIG. 1B is a scenario diagram of a physical-layer resource mapping method according to an example. FIG. 1C is a first schematic diagram illustrating physical-layer resource mapping according to an example. The physical-layer resource mapping method may be applied to UE. As shown in FIG. 1A, the physical-layer resource mapping method includes the following Steps 101-102.

In Step 101, during multiplexing transmission of hybrid automatic repeat request acknowledgement (HARQ-ACK) information and uplink data, a starting position and a frequency-domain offset for each of physical-layer resources that a HARQ-ACK modulation symbol is mapped to are determined.

In one or more embodiments, the frequency-domain offset may be a frequency-domain offset for one of a plurality of REs that different HARQ-ACK modulation symbols are mapped to. For example, the frequency-domain offset may identify one of a plurality of REs that different HARQ-ACK modulation symbols are mapped to. In other words, the frequency-domain offset may be used to map or distribute the plurality of REs to different HARQ-ACK modulation symbols so that the HARQ-ACK modulation symbols are uniformly distributed to as many OFDM symbols as possible in the frequency domain.

In one or more embodiments, a lowest frequency-domain position of an OFDM symbol next to a DMRS of the uplink data may be determined as the starting position, referring to the position marked by sign 11 or 12 in FIG. 1A. In one or more embodiments, a lowest frequency-domain position of a first OFDM symbol other than the DMRS of the uplink data may also be determined as the starting position, referring to the position marked by sign 11 in FIG. 1A. For example, if a symbol in front of an OFDM symbol where the DMRS is located is a null symbol, the position marked by sign 11 may be determined as the starting position. If the symbol in front of the OFDM symbol where the DMRS is located is not a null symbol, the position marked by sign 13 may be determined as the starting position.

In one or more embodiments, the frequency-domain offset may be understood as the frequency-domain offset for the REs that different HARQ-ACK modulation symbols are mapped to. In one or more embodiments, the frequency-domain offset may be determined based on the number N of OFDM symbols mappable for the HARQ-ACK modulation symbols, the number K of REs occupied by the HARQ-ACK modulation symbols and the number of REs in each OFDM symbol. In one or more embodiments, the frequency-domain offset may be determined based on the number K of the REs occupied by the HARQ-ACK modulation symbols and the number M of the REs in each OFDM symbol. In one or more embodiments, the frequency-domain offset may be a preset fixed value.

In Step 102, each HARQ-ACK modulation symbol is mapped to the corresponding RE according to the starting position and the frequency-domain offset.

In one or more embodiments, due to multiplexing transmission of the HARQ-ACK information and the uplink data, when each HARQ-ACK modulation symbol is mapped to the corresponding RE, an uplink data modulation symbol on the corresponding RE may be replaced.

In one or more embodiments, for different frequency-domain offsets, the HARQ-ACK modulation symbols may be mapped to corresponding REs in different manners. Please refer to descriptions in embodiments shown in FIG. 2A to FIG. 7A. Elaborations are omitted herein.

In an exemplary scenario, as shown in FIG. 1B, descriptions are made with a mobile network being a new-generation network such as a 5G network and a base station being a gNB as an example. The scenario shown in FIG. 1B includes a gNB 10 and UE 20. During data transmission between the gNB 10 and the UE 20, if the UE 20 has both uplink data and HARQ-ACK information to be sent to the gNB 10, HARQ-ACK modulation symbols may be uniformly distributed to as many OFDM symbols as possible in a frequency domain, so that uplink data transmission performance reduction caused by concentrated distribution of the HARQ-ACK modulation symbols on one or more OFDM symbols can be avoided.

The technical solution provided in the embodiment of the present disclosure will be described below with specific embodiments.

Figure 2B:
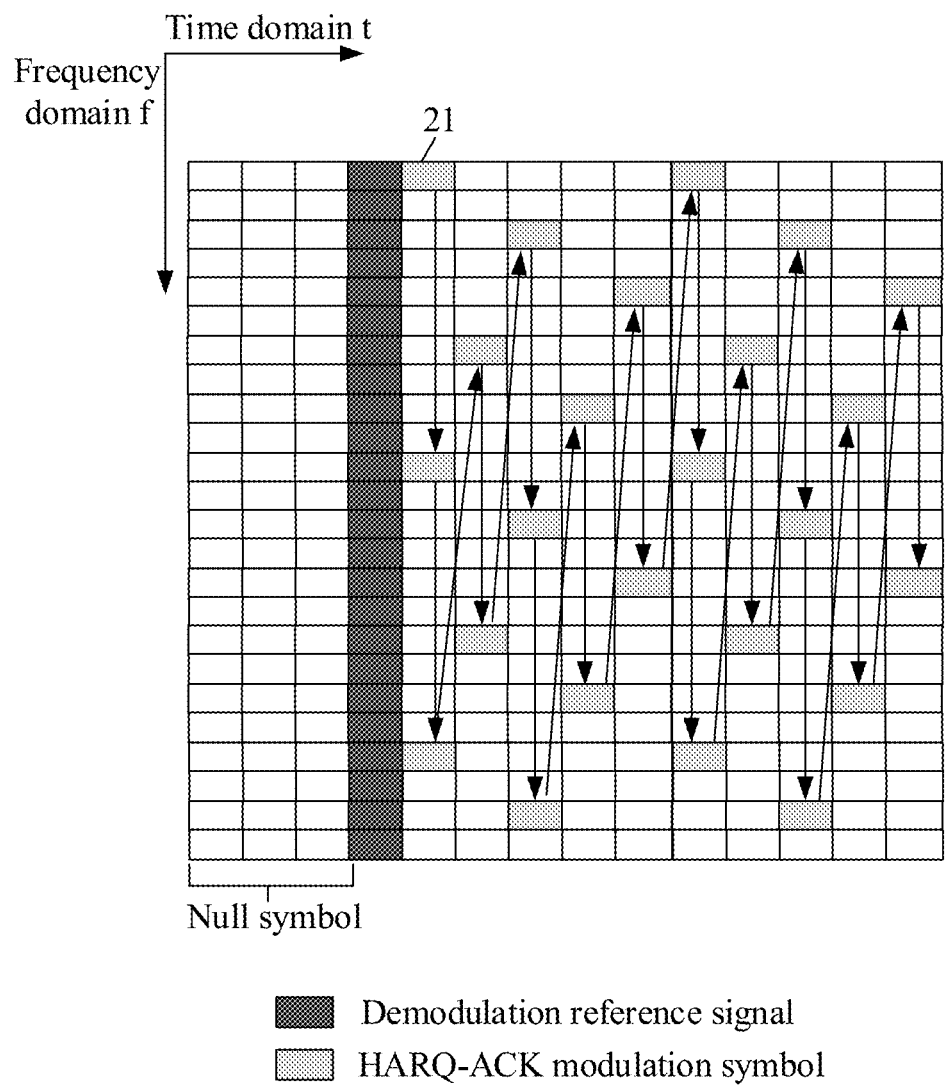
FIG. 2B is a second schematic diagram illustrating physical-layer resource mapping according to an example.

FIG. 2A is a flowchart showing another physical-layer resource mapping method according to an example. FIG. 2B is a second schematic diagram illustrating physical-layer resource mapping according to an example. In the embodiment, exemplary descriptions are made for the method provided in the embodiments of the present disclosure with how UE maps at least one HARQ-ACK modulation symbol to a physical-layer resource as an example. As shown in FIG. 2A, the following steps are included.

In Step 201, a starting position for a physical-layer resource that each HARQ-ACK modulation symbol is mapped to is determined, and a frequency-domain offset is determined based on the number N of OFDM symbols mappable for the HARQ-ACK modulation symbols, the number K of REs occupied by the HARQ-ACK modulation symbols and the number M of REs in each OFDM symbol.

In one or more embodiments, a manner for determining the starting position of each HARQ-ACK modulation symbol mapped to the physical-layer resource may refer to the descriptions about Step 101 in the embodiment shown in FIG. 1A and will not be elaborated herein.

In one or more embodiments, the frequency-domain offset may be determined based on Formula (1):

$$\text{floor}(M*N/K) \qquad \text{Formula (1).}$$

In Formula (1), M represents the number of the REs in each OFDM symbol, K represents the number of the REs occupied by the HARQ-ACK modulation symbol, and N represents the number of the OFDM symbols mappable for the HARQ-ACK modulation symbols.

In one or more embodiments, the number of the REs in each OFDM symbol may be a preset number such as 12 and 24; the number K of the REs occupied by the HARQ-ACK modulation symbols may be calculated by the UE according to a configuration of a base station and resource allocation of a Physical Uplink Shared Channel (PUSCH) and may be calculated based on a protocol; and the number N of the OFDM symbols mappable for the HARQ-ACK modulation symbols may be the number of remaining symbols, other than symbols occupied by a DMRS and a Phase Tracking Reference Signal (PT-RS), in OFDM symbols for uplink data transmission.

In one or more embodiments, based on Formula (1), if K=24, M=24 and N=10, referring to FIG. 2B, it may be calculated that the frequency-domain offset is floor(24×10/24)=10. Namely, an RE for a HARQ-ACK modulation symbol may be subjected to offsetting downwards by 10 REs in a frequency-domain to obtain an RE for the next HARQ-ACK modulation symbol.

In Step 202, a first HARQ-ACK modulation symbol is mapped to an RE where the starting position is.

In one or more embodiments, referring to FIG. 2B, if the starting position is the position indicated by sign 21, the first HARQ-ACK modulation symbol may be mapped to an RE where the starting position indicated by sign 21 is.

In Step 203, remaining HARQ-ACK modulation symbols are mapped to different REs one by one in a frequencydomain-first manner according to the frequency-domain offset for each of the remaining HARQ-ACK modulation symbols; and in response to a frequency-domain offset exceeding a frequency-domain range of an OFDM symbol, the HARQ-ACK modulation symbols being sequentially mapped to the REs of the next OFDM symbol.

In one or more embodiments, after the first HARQ-ACK modulation symbol is mapped to the RE where the starting position is, remaining HARQ-ACK modulation symbols may be sequentially mapped to the corresponding REs according to the frequency-domain offsets. The mapping sequence may refer to a sequence indicated by the arrowheads in FIG. 2B, namely the HARQ-ACK modulation symbols may be sequentially mapped to the REs of the next OFDM symbol in a case that the frequency-domain offset exceeds a frequency-domain range of an OFDM symbol.

In the embodiment, it is disclosed that HARQ-ACK modulation symbols are uniformly distributed to as many OFDM symbols as possible in a frequency domain in a manner of frequency domain first, so that uplink data transmission performance reduction caused by concentrated distribution of the HARQ-ACK modulation symbol on one or more OFDM symbols can be avoided. Multiplexing of HARQ-ACK modulation symbols on time-frequency resources for uplink data is implemented in a frequency-domain-first manner.

Figure 3A:
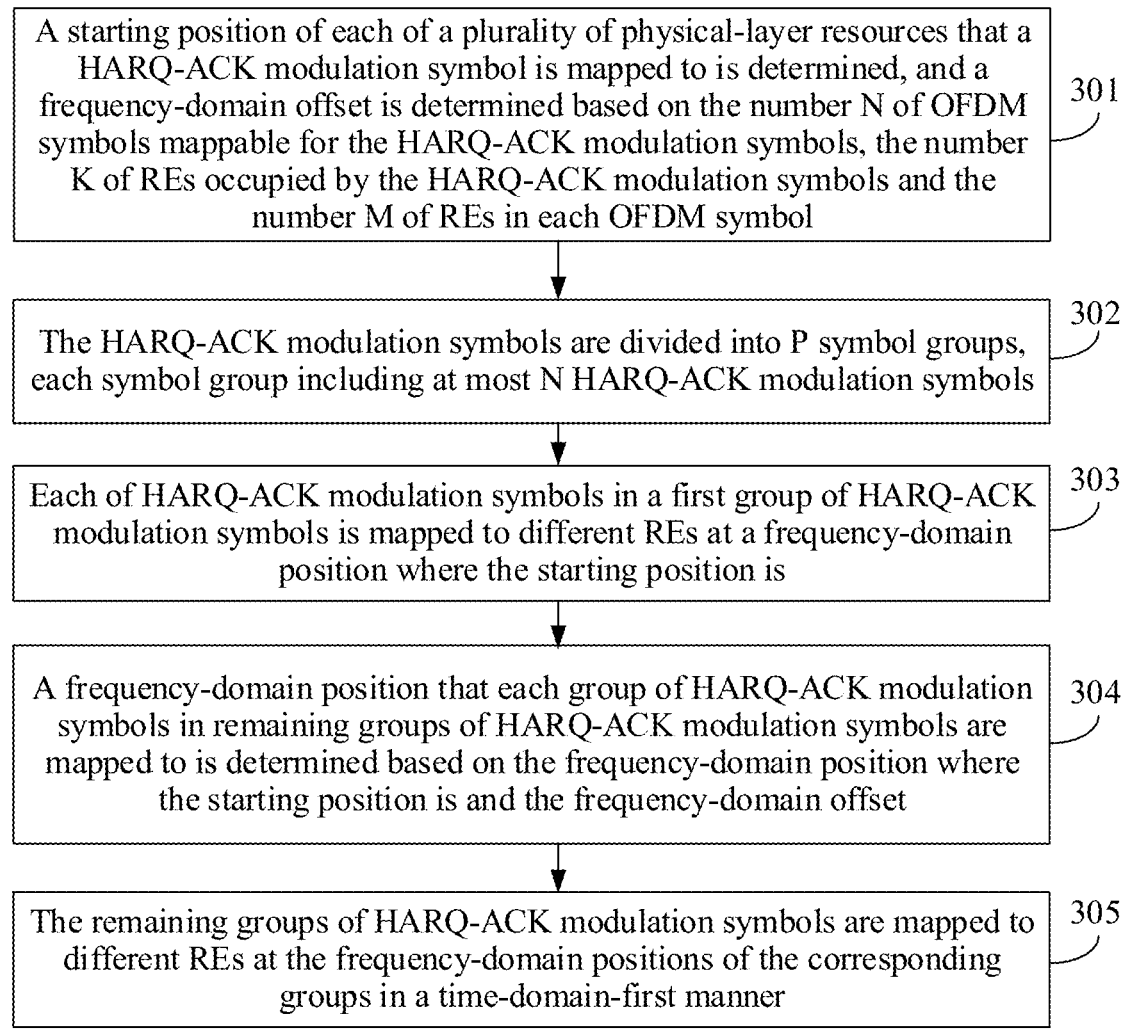
FIG. 3A is a flowchart showing another physical-layer resource mapping method according to an example.

FIG. 3A is a flowchart showing another physical-layer resource mapping method according to an example. FIG. 3B is a third schematic diagram illustrating physical-layer resource mapping according to an example. In the embodiment, exemplary descriptions are made for the method provided in the embodiments of the present disclosure with how UE maps at least one HARQ-ACK modulation symbols to a physical-layer resource as an example. As shown in FIG. 3A, the following steps are included.

In Step 301, a starting position of each of a plurality of physical-layer resources that a HARQ-ACK modulation symbol is mapped to is determined, and a frequency-domain offset is determined based on the number N of OFDM symbols mappable for the HARQ-ACK modulation symbols, the number K of REs occupied by the HARQ-ACK modulation symbols and the number M of REs in each OFDM symbol.

In one or more embodiments, a manner for determining the starting position for each of a plurality of physical-layer resources that a HARQ-ACK modulation symbol is mapped to may refer to the descriptions about Step 101 in the embodiment shown in FIG. 1A and will not be elaborated herein.

In one or more embodiments, the frequency-domain offset may be determined based on Formula (2):

$$\text{floor}(M/\text{ceil}(K/N)) \qquad \text{Formula (2).}$$

In Formula (2), M represents the number of the REs in each OFDM symbol, K represents the number of the REs occupied by the HARQ-ACK modulation symbol, and N represents the number of the OFDM symbols mappable for the HARQ-ACK modulation symbols.

In one or more embodiments, the number of the REs in each OFDM symbol may be a preset number such as 12 and 24; the number K of the REs occupied by the HARQ-ACK modulation symbols may be calculated by the UE according to a configuration of a base station side and resource allocation of a PUSCH and may be calculated based on a protocol; and the number N of the OFDM symbols mappable for the HARQ-ACK modulation symbols may be the number of remaining symbols, other than symbols occupied by a DMRS and a PT-RS, in OFDM symbols for uplink data transmission.

In one or more embodiments, based on Formula (2), if K=24, M=24 and N=10, referring to FIG. 3B, it may be calculated that the frequency-domain offset is floor(24/ceil(24/10))=8, namely, an RE for a HARQ-ACK modulation symbol may be subjected to offsetting downwards by 8 REs in a frequency-domain to obtain an RE for the next HARQ-ACK modulation symbol.

In Step 302, the HARQ-ACK modulation symbols are divided into P symbol groups, each symbol group including at most N HARQ-ACK modulation symbols.

In one or more embodiments, referring to the example of Step 301, there is made such a hypothesis that the number of the OFDM symbols mappable for the HARQ-ACK modulation symbols is 10 and the number of the REs for the HARQ-ACK modulation symbols is 24. Since each symbol group includes at most 10 HARQ-ACK modulation symbols, the HARQ-ACK modulation symbols may be divided into three groups, that is, each of a first group and a second group includes 10 HARQ-ACK modulation symbols and a third group includes 4 HARQ-ACK modulation symbols, or each of the three symbol group includes 8 HARQ-ACK modulation symbols.

In Step 303, each of HARQ-ACK modulation symbols in a first group of HARQ-ACK modulation symbols is mapped to different REs at a frequency-domain position where the starting position is.

In Step 304, a frequency-domain position that each group of HARQ-ACK modulation symbols in remaining groups of HARQ-ACK modulation symbols are mapped to is determined based on the frequency-domain position where the starting position is and the frequency-domain offset.

In Step 305, the remaining groups of HARQ-ACK modulation symbols are mapped to different REs at the frequency-domain positions of the corresponding groups in a time-domain-first manner.

In one or more embodiments, in Step 303 to Step 305, the HARQ-ACK modulation symbols in the first group may be mapped one by one to different REs at the frequency-domain position where the starting position is, and then the frequency-domain positions corresponding to a second group and each subsequent group may be determined based on the frequency-domain position where the starting position of the first group is and the frequency-domain offset. Referring to FIG. 3B, the frequency-domain offset is 8, and thus it may be determined that the frequency-domain positions of the subsequent groups are 9 and 17 respectively. The other groups may be also mapped to different REs at the frequency-domain positions of the corresponding groups in a time-domain-first manner.

In the embodiment, it is disclosed that the HARQ-ACK modulation symbols are uniformly distributed to as many OFDM symbols as possible in a frequency domain in a time-domain-first manner, so that uplink data transmission performance reduction caused by concentrated distribution of the HARQ-ACK modulation symbol on one or more OFDM symbols can be avoided. Multiplexing of the HARQ-ACK modulation symbols on time-frequency resources for the uplink data is implemented in a time-domain-first manner.

Figure 4B:
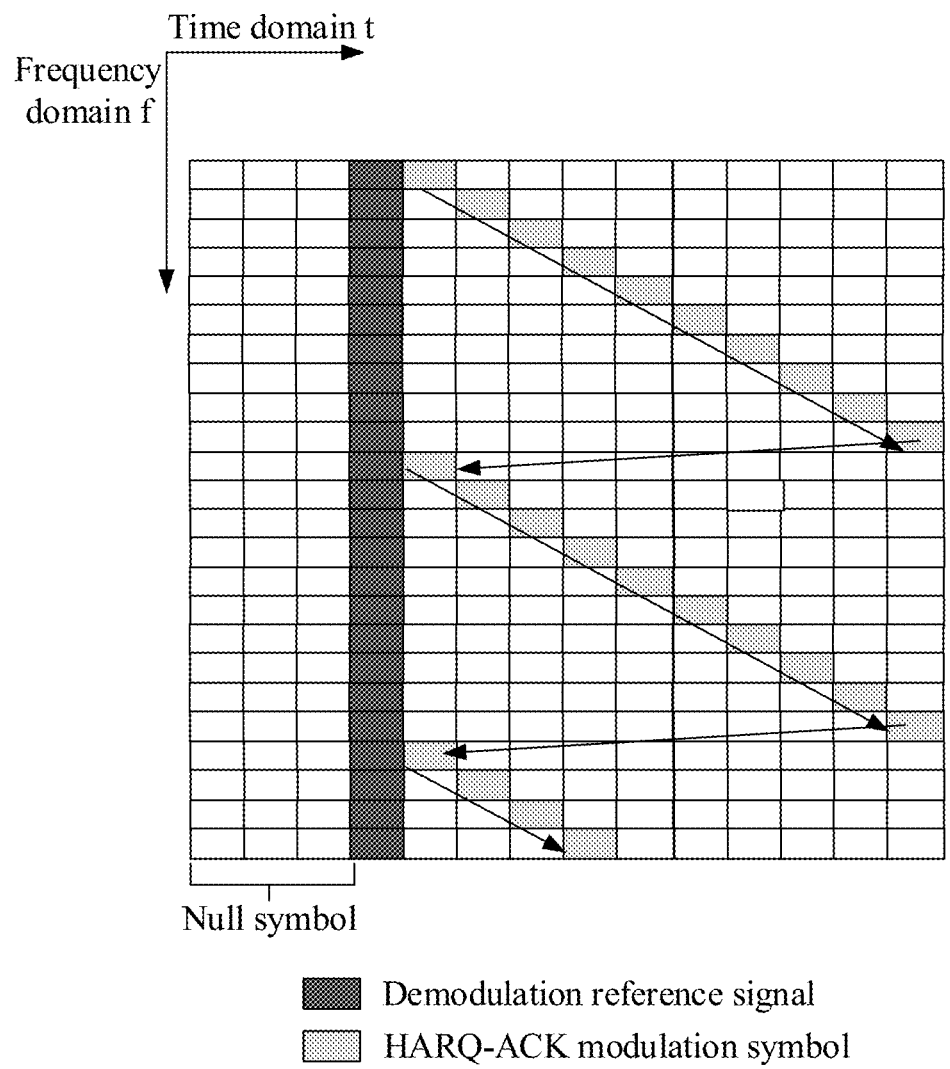
FIG. 4B is a fourth schematic diagram illustrating physical-layer resource mapping according to an example.

FIG. 4A is a flowchart showing another physical-layer resource mapping method according to an example. FIG. 4B is a fourth schematic diagram illustrating physical-layer resource mapping according to an example. In the embodiment, exemplary descriptions are made for the method provided in the embodiments of the present disclosure with how UE maps at least one HARQ-ACK modulation symbol to a physical-layer resource as an example. As shown in FIG. 4A, the following steps are included.

In Step 401, a starting position for each of a plurality of physical-layer resources that a HARQ-ACK modulation symbol is mapped to is determined, and a frequency-domain offset is determined based on the number K of REs occupied by the HARQ-ACK modulation symbols and the number M of REs in each OFDM symbol.

In one or more embodiments, a manner for determining the starting position for each of a plurality of physical-layer resources that a HARQ-ACK modulation symbol is mapped to may refer to the descriptions about Step 101 in the embodiment shown in FIG. 1A and will not be elaborated herein.

In one or more embodiments, the frequency-domain offset may be determined based on Formula (3):

$$\operatorname{ceil}(M/K) \qquad \text{Formula (3)}.$$

In Formula (3), M represents the number of the REs in each OFDM symbol, and K represents the number of the REs occupied by the HARQ-ACK modulation symbol.

In Step 402, Q HARQ-ACK modulation symbols are mapped, from a RE where the starting position is, to different REs with the same frequency-domain position in a time-domain-first manner, and then are subjected to offsetting based on the frequency-domain offset, and then next Q HARQ-ACK modulation symbols are mapped to different REs, Q being calculated based on K and M.

In one or more embodiments, a value of Q may be determined based on Formula (4):

$$\operatorname{ceil}(K/M) \qquad \text{Formula (4)}.$$

In Formula (4), M represents the number of the REs in each OFDM symbol, and K represents the number of the REs occupied by the HARQ-ACK modulation symbols.

In one or more embodiments, in Step 401 to Step 402, based on Formula (3) and Formula (4), if K=24, M=24 and N=10, referring to FIG. 4B, it may be calculated that the frequency-domain offset is ceil(24/24)=1 and Q is ceil(24/24)=1. That is, the frequency-domain offset is 1, and ceil (24/24)=1 HARQ-ACK modulation symbol is mapped at each frequency-domain position.

In the embodiment, it is disclosed that HARQ-ACK modulation symbols may be uniformly distributed to as many OFDM symbols as possible in a frequency domain in the manner of time domain first, and each frequency-domain offset and the number, corresponding to each frequency-domain offset, of REs that the HARQ-ACK modulation symbols are mapped to may be determined based on the number of the REs in each OFDM symbol and the number of the REs occupied by the HARQ-ACK modulation symbols, so that uplink data transmission performance reduction caused by concentrated distribution of the HARQ-ACK modulation symbols on one or more OFDM symbols can be avoided. Multiplexing of HARQ-ACK modulation symbols on time-frequency resources for uplink data is implemented in a time-domain-first manner.

Figure 5A:
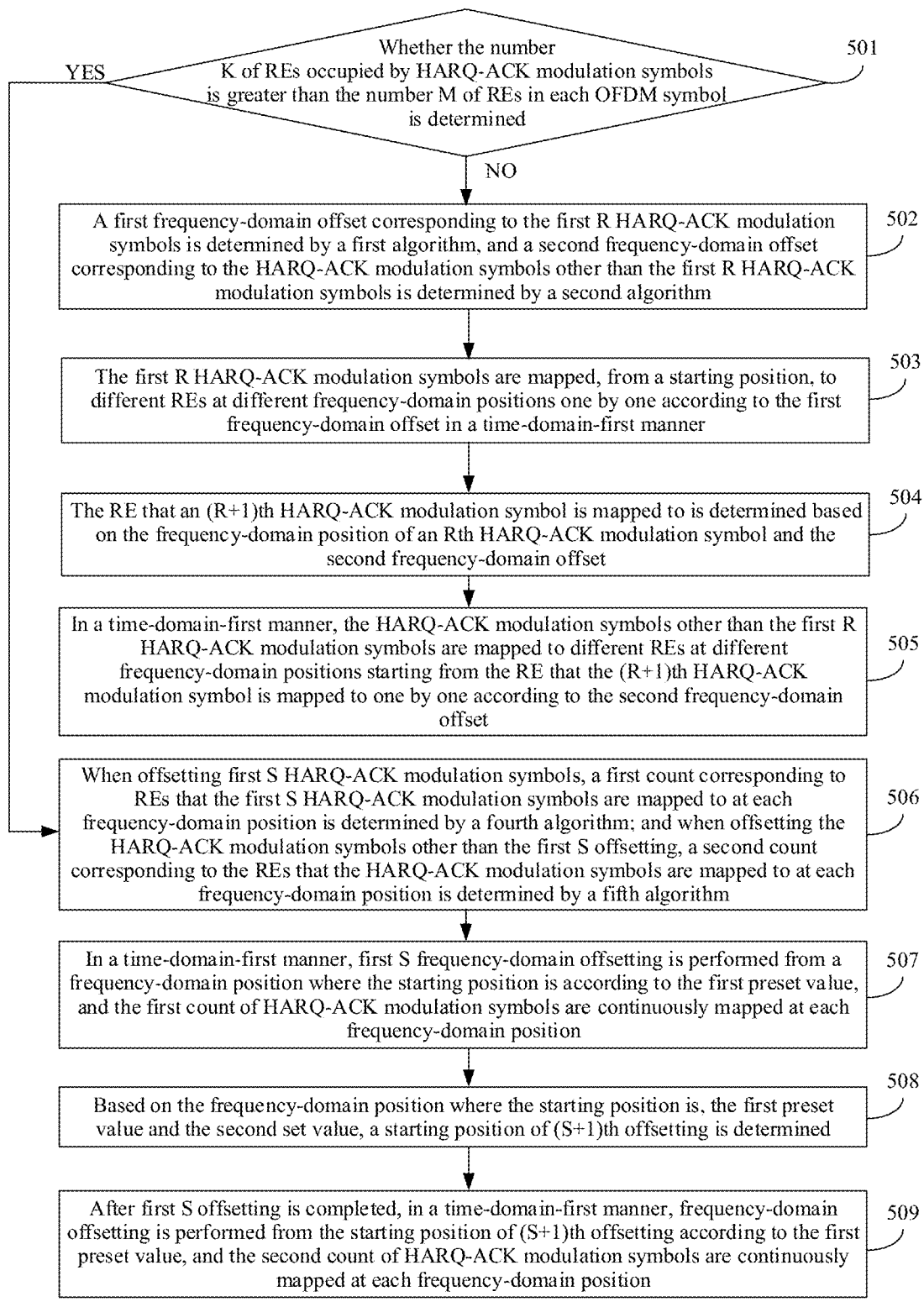
FIG. 5A is a flowchart showing another physical-layer resource mapping method according to an example.
Figure 5B:
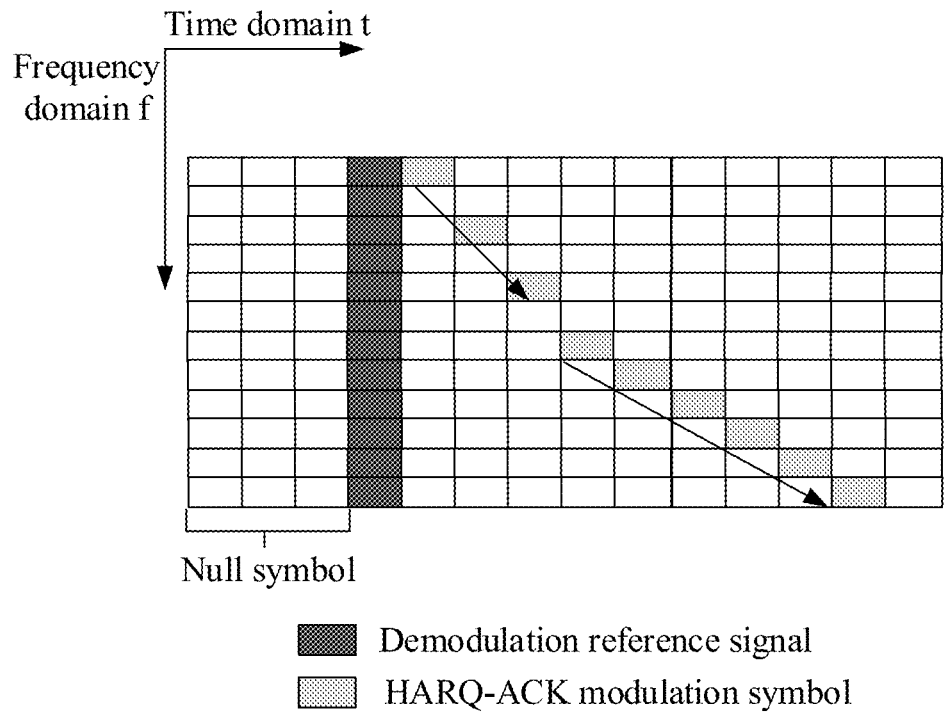
FIG. 5B is a fifth schematic diagram illustrating physical-layer resource mapping according to an example.
Figure 5C:
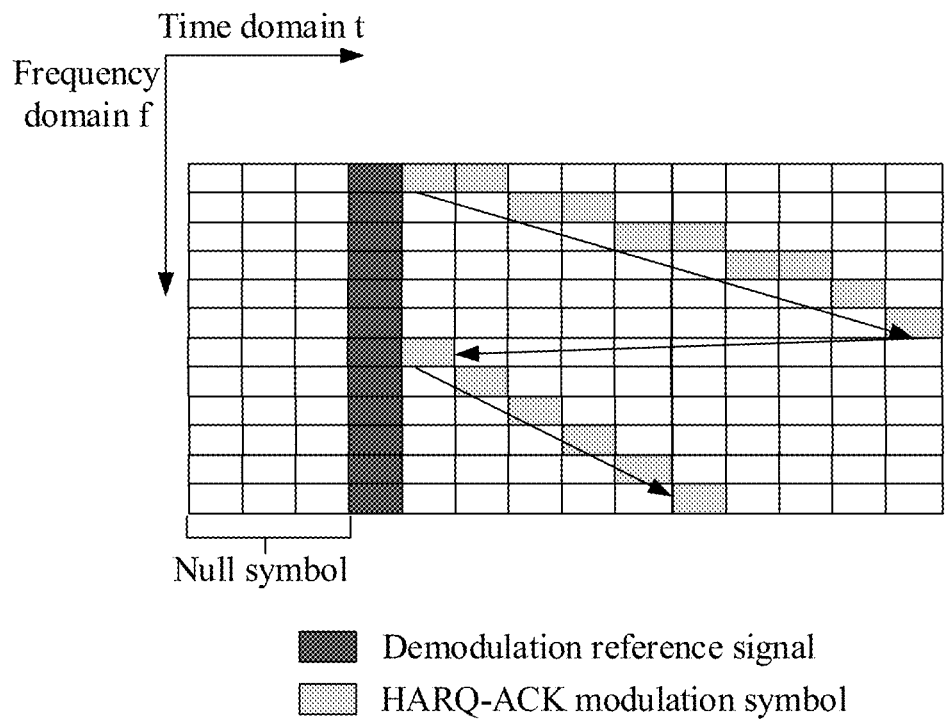
FIG. 5C is a sixth schematic diagram illustrating physical-layer resource mapping according to an example.

FIG. 5A is a flowchart showing another physical-layer resource mapping method according to an example. FIG. 5B is a fifth schematic diagram illustrating physical-layer resource mapping according to an example. FIG. 5C is a sixth schematic diagram illustrating physical-layer resource mapping according to an example. In the embodiments, exemplary descriptions are made for the method provided in the embodiments of the present disclosure with how UE maps at least one HARQ-ACK modulation symbol to a physical-layer resource as an example. As shown in FIG. 5A, the following steps are included.

In Step 501, whether the number K of REs occupied by HARQ-ACK modulation symbols is greater than the number M of REs in each OFDM symbol is determined, Step 506 is executed when K is greater than M, otherwise, Step 502 is executed when K is not greater than M.

In Step 502, a first frequency-domain offset corresponding to the first R HARQ-ACK modulation symbols is determined by a first algorithm, and a second frequency-domain offset corresponding to the HARQ-ACK modulation symbols other than the first R HARQ-ACK modulation symbols is determined by a second algorithm.

In one or more embodiments, the first frequency-domain offset may be determined by the first algorithm through Formula (3) to calculate the number of REs by which the HARQ-ACK modulation symbols are required to be subjected to offsetting during each frequency-domain offsetting, and R may be calculated through Formula (5):

$$\operatorname{mod}(M,K) \qquad \text{Formula (5)}.$$

In one or more embodiments, the second frequency-domain offset may be calculated by the second algorithm through Formula (6):

$$\operatorname{floor}(M/K) \qquad \text{Formula (6)}.$$

In Step 503, the first R HARQ-ACK modulation symbols are mapped, from a starting position, to different REs at different frequency-domain positions one by one according to the first frequency-domain offset in a time-domain-first manner.

In Step 504, the RE that an (R+1)th HARQ-ACK modulation symbol is mapped to is determined based on the frequency-domain position of an Rth HARQ-ACK modulation symbol and the second frequency-domain offset.

In Step 505, in a time-domain-first manner, the HARQ-ACK modulation symbols other than the first R HARQ-ACK modulation symbols are mapped to different REs at different frequency-domain positions starting from the RE that the (R+1)th HARQ-ACK modulation symbol is mapped to one by one according to the second frequency-domain offset.

In one or more embodiments, in Step 503 to Step 505, referring to FIG. 5B, if K=9, M=12, N=10 and the starting position is a lowest frequency-domain position of a right symbol next to a DMRS, it may be determined that the first frequency-domain offset is ceil(12/9)=2, the second frequency-domain offset is floor(12/9)=1 and R is mod (12, 9)=3, namely a frequency-domain offset of first three mapping REs is 2 and a frequency-domain offset of next REs is 1.

In Step 506, when offsetting first S HARQ-ACK modulation symbols, a first count corresponding to REs that the first S HARQ-ACK modulation symbols are mapped to at each frequency-domain position is determined by a fourth algorithm; and when offsetting the HARQ-ACK modulation symbols other than the first S offsetting, a second count corresponding to the REs that the HARQ-ACK modulation symbols are mapped to at each frequency-domain position is determined by a fifth algorithm.

In one or more embodiments, the first count may be determined by the fourth algorithm through Formula (4), and the second count may be calculated by the fifth algorithm through Formula (7):

$$\operatorname{floor}(K/M) \qquad \text{Formula (7)}.$$

In one or more embodiments, a value of S may be calculated based on a sixth algorithm, and the value of S may be calculated by the sixth algorithm through Formula (8):

$$\mod(K, M) \qquad \text{Formula (8).}$$

In one or more embodiments, a frequency-domain offset corresponding to first S offsetting may be a first preset value, and a frequency-domain offset corresponding to frequency-domain offsetting other than first S offsetting may be a second set value.

In one or more embodiments, the first preset value and the second set value, for example, both are 1, may be preset by a base station.

In Step 507, in a time-domain-first manner, first S frequency-domain offsetting is performed from a frequency-domain position where the starting position is according to the first preset value, and the first count of HARQ-ACK modulation symbols are continuously mapped at each frequency-domain position.

In Step 508, a starting position of (S+1)th offsetting is determined based on the frequency-domain position where the starting position is, the first preset value and the second set value.

In Step 509, after first S offsetting is completed, in a time-domain-first manner, frequency-domain offsetting is performed from the starting position of (S+1)th offsetting according to the first preset value, and the second count of HARQ-ACK modulation symbols are continuously mapped at each frequency-domain position.

In one or more embodiments, in Step 507 to Step 509, referring to FIG. 5C, if K=16, M=12, N=10, both the first preset value and the second set value are 1 and the starting position is the lowest frequency-domain position of the right symbol next to the DMRS, it may be determined that the first count is ceil(16/12)=2, the second count is floor(16/12)=1 and the value of S is mod (16, 12)=4, namely, during frequency-domain offsetting within first four offsetting, two REs are mapped at each frequency-domain position and the frequency-domain offset is 1, and subsequently, one RE is mapped at each frequency-domain position and the frequency-domain offset is 1.

In the embodiment, it is disclosed that HARQ-ACK modulation symbols may be uniformly distributed to as many OFDM symbols as possible in the manner of time domain first in a frequency domain; and each frequency-domain offset and the number, corresponding to each frequency-domain offset, of the REs that the HARQ-ACK modulation symbols are mapped to may be determined by different mapping algorithms based on magnitudes of the number of the REs in each OFDM symbol and the number of the REs occupied by the HARQ-ACK modulation symbols, so that resource mapping manners can be more diversified.

In one or more embodiments, in FIG. 2A to FIG. 5A, exemplary descriptions are made with calculation of a mapping parameter such as a frequency-domain offset using different algorithms such as Formula (1) to Formula (8) as an example. In the present disclosure, the parameter such as the frequency-domain offset may also be acquired through other algorithms. For different mapping solutions in the HARQ-ACK modulation symbol mapping method involved in the abovementioned embodiments, a sequence of Formula (1) to Formula (8) may also be adjusted to acquire mapping parameters in the corresponding mapping methods. A calculation formula for each mapping manner is not limited in the present disclosure.

Figure 6A:
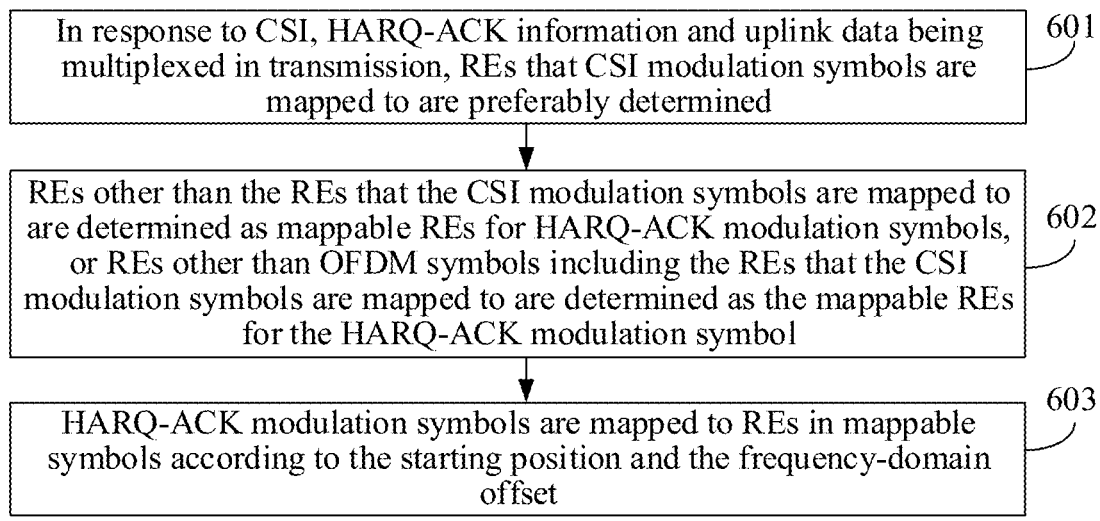
FIG. 6A is a flowchart showing another physical-layer resource mapping method according to an example.
Figure 6B:
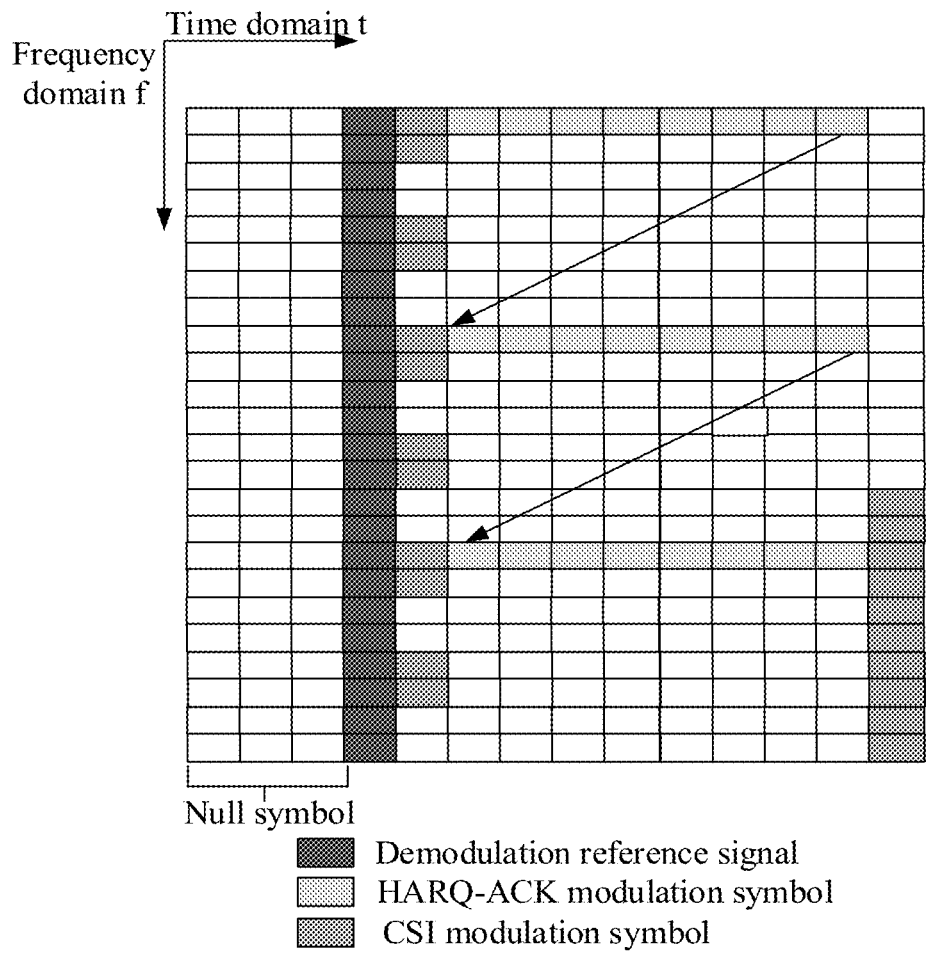
FIG. 6B is a seventh schematic diagram illustrating physical-layer resource mapping according to an example.

FIG. 6A is a flowchart showing another physical-layer resource mapping method according to an example. FIG. 6B is a seventh schematic diagram illustrating physical-layer resource mapping according to an example. In the embodiments, exemplary descriptions are made for the method provided in the embodiments of the present disclosure with how UE maps at least one HARQ-ACK modulation symbol to a physical-layer resource as an example. As shown in FIG. 6A, the following steps are included.

In Step 601, in response to CSI, HARQ-ACK information and uplink data being multiplexed in transmission, REs that CSI modulation symbols are mapped to are preferably determined. For example, during or after multiplexing transmission of CSI, HARQ-ACK information and uplink data, REs that CSI modulation symbols are mapped to are preferably determined.

In Step 602, REs other than the REs that the CSI modulation symbols are mapped to are determined as mappable REs for HARQ-ACK modulation symbols, or REs other than OFDM symbols including the REs that the CSI modulation symbols are mapped to are determined as the mappable REs for the HARQ-ACK modulation symbols.

In one or more embodiments, after the mappable REs for the HARQ-ACK modulation symbols are determined, the REs that the HARQ-ACK modulation symbols are mapped to may be selected from the mappable REs for the HARQ-ACK modulation symbols based on a starting position and a frequency-domain offset.

In Step 603, HARQ-ACK modulation symbols are mapped to REs in mappable symbols according to the starting position and the frequency-domain offset.

In one or more embodiments, referring to FIG. 6B, a mapping manner of uniformly distributing the CSI modulation symbols to a whole frequency resource on symbols next to DMRSs and implementing continuous distribution at the tail of a last OFDM in a frequency domain is illustrated, which is only a mapping example. The REs that the CSI modulation symbols are mapped to are not limited here, and the specific REs that the CSI modulation symbols are mapped to may be predetermined by a base station. Moreover, the REs other than the OFDM symbols including the REs that the CSI modulation symbols are mapped to may be determined as the mappable REs for the HARQ-ACK modulation symbols so as to map the HARQ-ACK modulation symbols to physical-layer resources in a manner of time domain first.

In one or more embodiments, the specific RE that the HARQ-ACK modulation symbol is mapped to may be determined by the variety embodiments of HARQ-ACK modulation symbol mapping methods shown in FIG. 2A to FIG. 5A.

In the embodiment, an implementation mode of mapping CSI modulation symbols and HARQ-ACK modulation symbols to physical-layer resources during multiplexing transmission of CSI, HARQ-ACK information and uplink data is disclosed, which is favorable for UE to uniformly distribute HARQ-ACK modulation symbols to as many OFDM symbols as possible in a frequency domain without occupying the REs that the CSI modulation symbols are mapped to.

Figure 7A:
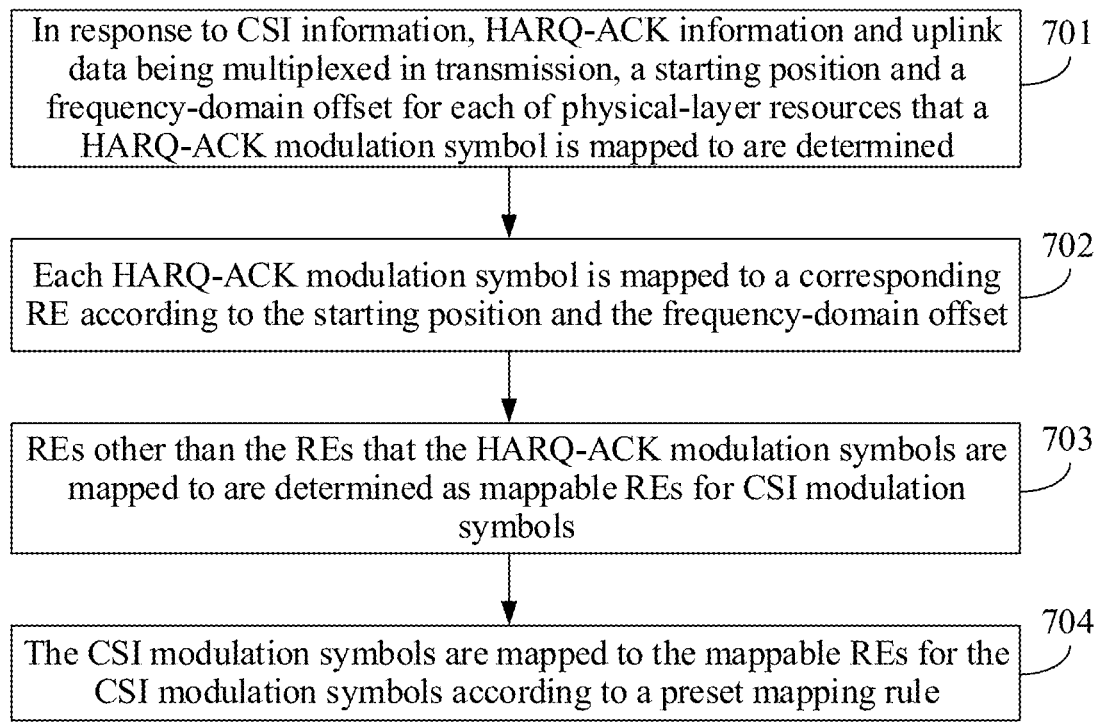
FIG. 7A is a flowchart showing another physical-layer resource mapping method according to an example.
Figure 7B:
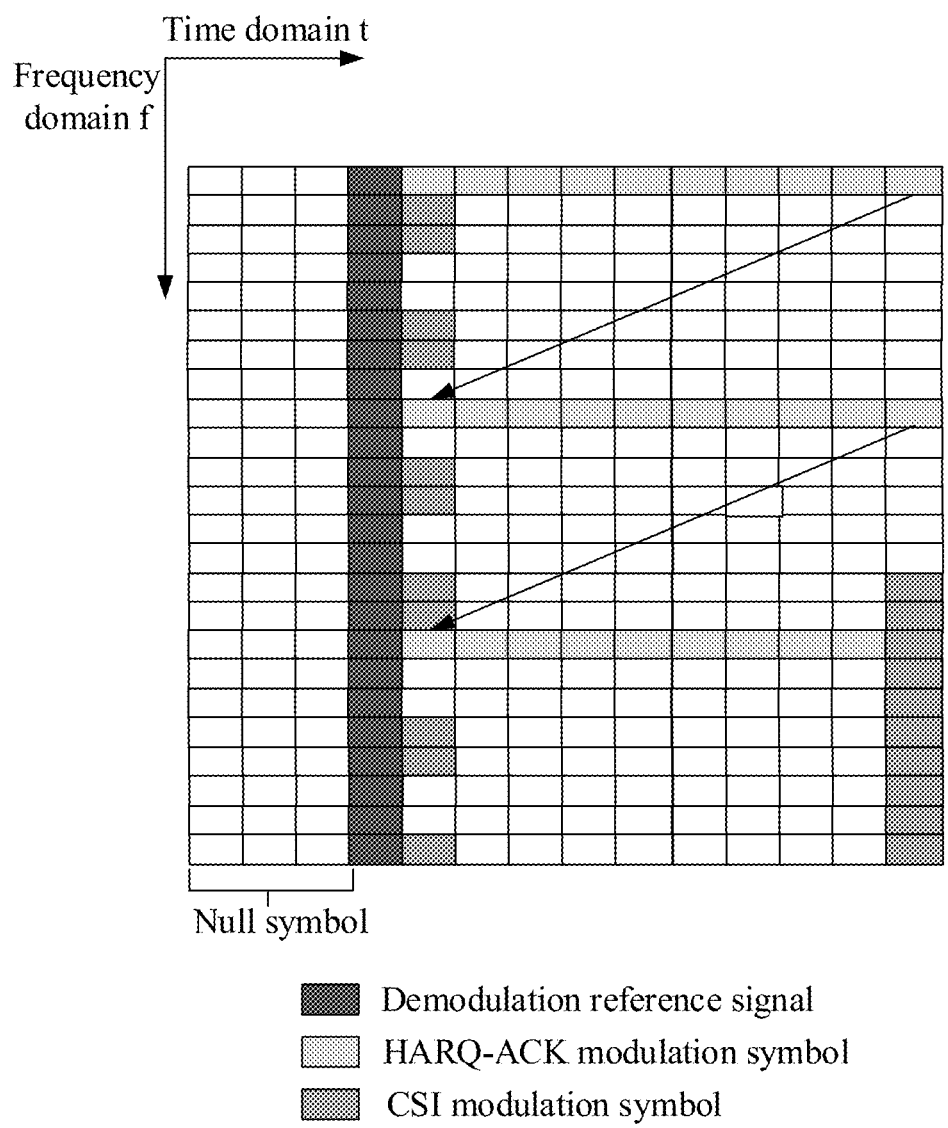
FIG. 7B is an eighth schematic diagram illustrating physical-layer resource mapping according to an example.

FIG. 7A is a flowchart showing another physical-layer resource mapping method according to an example. FIG. 7B is an eighth schematic diagram illustrating physical-layer resource mapping according to an example. In the embodiments, exemplary descriptions are made for the method provided in the embodiments of the present disclosure with how UE maps at least one HARQ-ACK modulation symbol to a physical-layer resource as an example. As shown in FIG. 7A, the following steps are included.

In Step 701, in response to CSI information, HARQ-ACK information and uplink data being multiplexed in transmission, a starting position and a frequency-domain offset for each of physical-layer resources that a HARQ-ACK modulation symbol is mapped to are determined. For example, during or after multiplexing transmission of CSI information, HARQ-ACK information and uplink data, a starting position and a frequency-domain offset for each of physical-layer resources that a HARQ-ACK modulation symbol is mapped to are determined.

In Step 702, each HARQ-ACK modulation symbol is mapped to a corresponding RE according to the starting position and the frequency-domain offset.

In one or more embodiments, descriptions about Step 701 and Step 702 may refer to the method described in the embodiment shown in FIG. 1A and elaborations are omitted herein.

In Step 703, REs other than the REs that the HARQ-ACK modulation symbols are mapped to are determined as mappable REs for CSI modulation symbols.

In Step 704, the CSI modulation symbols are mapped to the mappable REs for the CSI modulation symbols according to a preset mapping rule.

In one or more embodiments, the preset mapping rule may be a mapping rule for the CSI modulation symbols. The CSI information may include two parts of information, the two parts of information may be mapped to different REs in different manners respectively, and the preset mapping rule may be predetermined by a base station.

In the embodiment, an implementation mode of mapping CSI modulation symbols and HARQ-ACK modulation symbols to physical-layer resources during multiplexing transmission of CSI, HARQ-ACK information and uplink data is disclosed, which is favorable for the UE to uniformly distribute CSI modulation symbols and HARQ-ACK modulation symbols to as many OFDM symbols as possible in a frequency domain.

Figure 8:
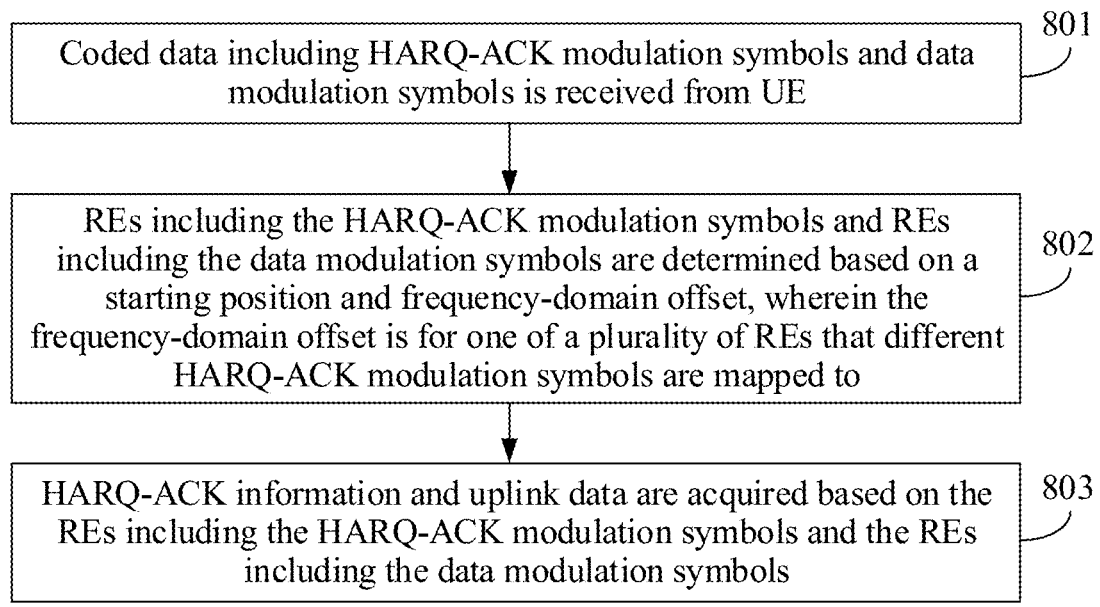
FIG. 8 is a flowchart showing a physical-layer resource mapping method according to an example.

FIG. 8 is a flowchart showing a physical-layer resource mapping method according to an example. The physical-layer resource mapping method may be applied to a base station. As shown in FIG. 8, the physical-layer resource mapping method includes the following Steps 801-803.

In Step 801, coded data including HARQ-ACK modulation symbols and data modulation symbols is received from UE.

In Step 802, REs including the HARQ-ACK modulation symbols and REs including the data modulation symbols are determined based on a starting position and frequency-domain offset, the frequency-domain offset identifying one of a plurality of REs that different HARQ-ACK modulation symbols are mapped to.

In one or more embodiments, the starting position for each of physical-layer resources that a HARQ-ACK modulation symbol is mapped to may be a lowest frequency-domain position of an OFDM symbol next to a DMRS of the uplink data, or may be a lowest frequency-domain position of a first OFDM symbol other than a DMRS of the uplink data.

In one or more embodiments, the frequency-domain offset for each of physical-layer resources that a HARQ-ACK modulation symbol is mapped to may be obtained based on the number K of the REs occupied by the HARQ-ACK modulation symbols and the number M of REs in each OFDM symbol.

In one or more embodiments, the frequency-domain offset for each of physical-layer resources that a HARQ-ACK modulation symbol is mapped to may be obtained based on the number N of OFDM symbols mappable for the HARQ-ACK modulation symbols, the number K of the REs occupied by the HARQ-ACK modulation symbols and the number M of the REs in each OFDM symbol.

In one or more embodiments, the base station and the UE may predetermine a specific manner for calculating the starting position and the frequency-domain offset, and then the base station, when receiving the coded data including the HARQ-ACK modulation symbols and the data modulation symbols, may determine specific REs that the HARQ-ACK modulation symbols are mapped to based on the corresponding calculation manner for the starting position and the frequency-domain offset.

In one or more embodiments, the manner for calculating the frequency-domain offset may refer to the descriptions in the embodiments shown in FIG. 2A to FIG. 5A and will not be elaborated herein.

In Step 803, HARQ-ACK information and uplink data are acquired based on the REs including the HARQ-ACK modulation symbols and the REs including the data modulation symbols.

In the embodiment, in response to receiving the coded data sent by the UE, the base station may determine the REs including the HARQ-ACK modulation symbols and the REs including the data modulation symbols based on a mapping manner for the HARQ-ACK modulation symbols and further implement correct decoding, thereby ensuring correct reception of the data.

Figure 9:
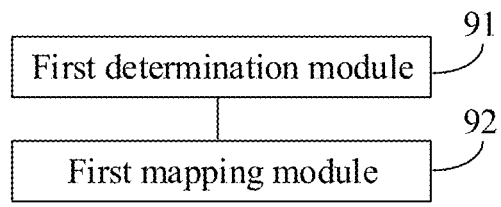
FIG. 9 is a block diagram of a physical-layer resource mapping device according to an example.

FIG. 9 is a block diagram of a physical-layer resource mapping device according to an example. The physical-layer resource mapping device is applied to UE. As shown in FIG. 9, the physical-layer resource mapping device includes:

a first determination module 91, configured to, during multiplexing transmission of hybrid automatic repeat request acknowledgement (HARQ-ACK) information and uplink data, determine a frequency-domain offset and a starting position for each of physical-layer resources that a HARQ-ACK modulation symbol is mapped to, wherein the frequency-domain offset is for identifying one of a plurality of resource elements (REs) that different HARQ-ACK modulation symbols are mapped to; and a first mapping module 92, configured to map each HARQ-ACK modulation symbol to a corresponding REs according to the starting position and the frequency-domain offset determined by the first determination module 91.

Figure 10:
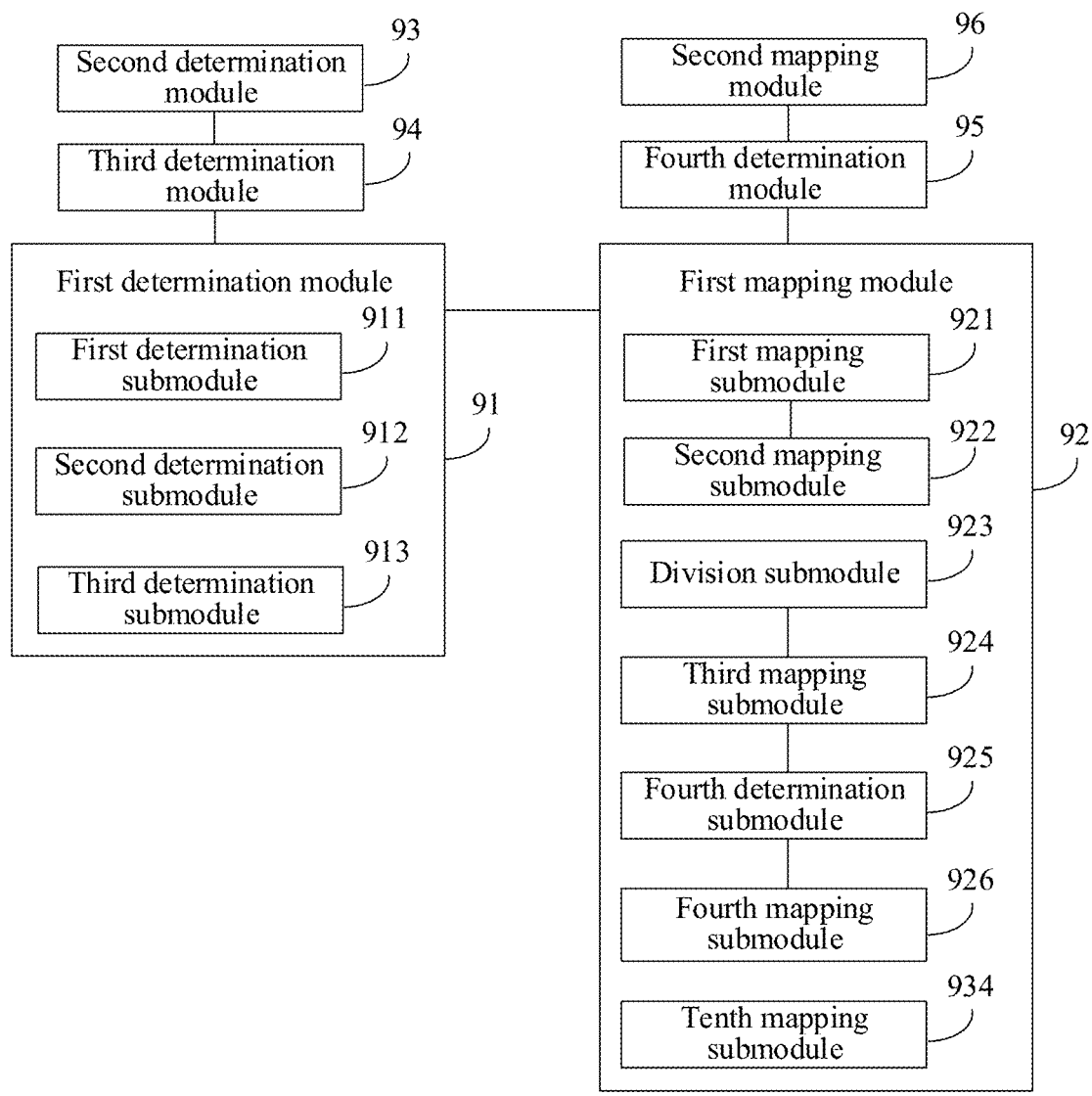
FIG. 10 is a block diagram of another physical-layer resource mapping device according to an example.
Figure 11:
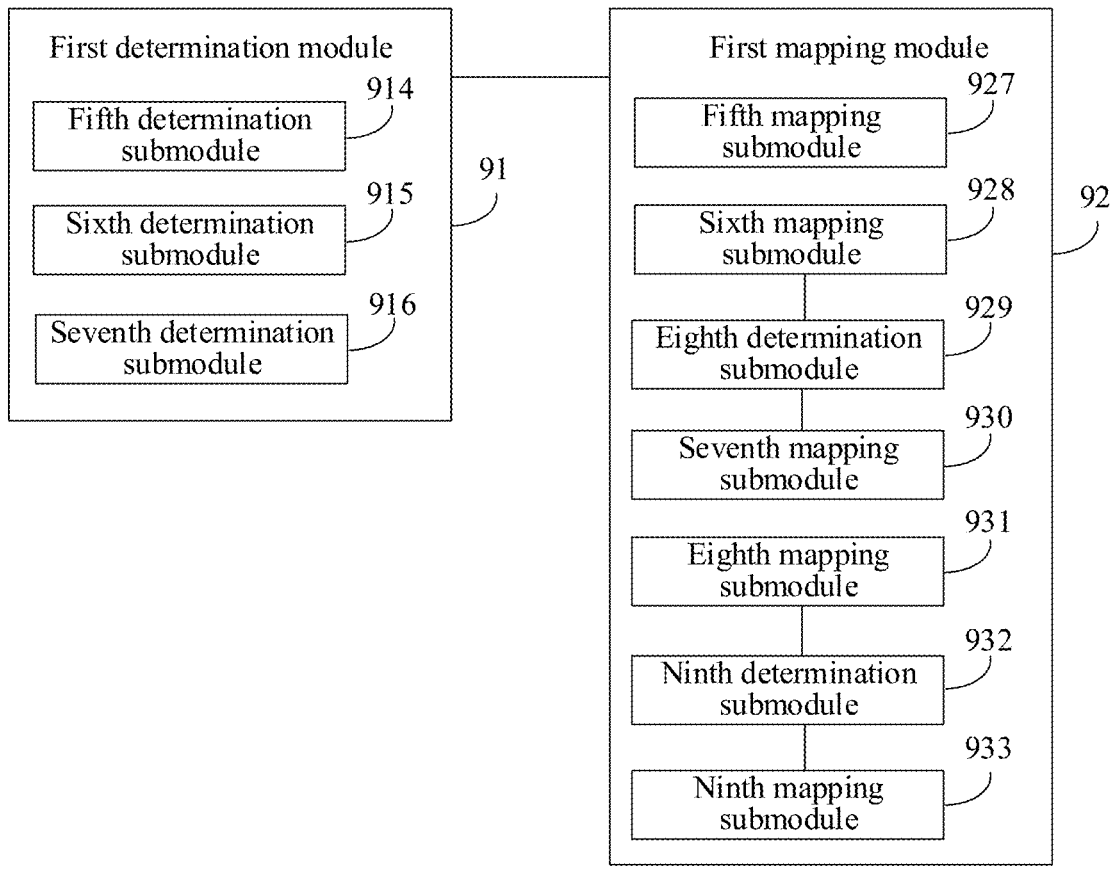
FIG. 11 is a block diagram of another physical-layer resource mapping device according to an example.

FIG. 10 is a block diagram of another physical-layer resource mapping device according to an example. As shown in FIG. 11, based on the embodiment shown in FIG. 9, in one or more embodiments, the first determination module 91 may include:

a first determination submodule 911, configured to determine a lowest frequency-domain position of an OFDM symbol next to a DMRS of the uplink data as the starting position; or, a second determination submodule 912, configured to determine a lowest frequency-domain position of a first OFDM symbol other than a DMRS of the uplink data as the starting position.

In one or more embodiments, the first determination module 91 may include:

a third determination submodule 913, configured to determine the frequency-domain offset based on the number N of OFDM symbols mappable for the HARQ-ACK modulation symbols, the number K of REs occupied by the HARQ-ACK modulation symbols and the number M of REs in each OFDM symbol.

In one or more embodiments, the first mapping module 92 may include:

a first mapping submodule 921, configured to map a first HARQ-ACK modulation symbol to an RE where the starting position is; and a second mapping submodule 922, configured to map remaining HARQ-ACK modulation symbols to different REs one by one in a frequency-domain-first manner according to the frequency-domain offset for each of the remaining HARQ-ACK modulation symbols; and in response to the frequency-domain offset exceeds a frequency-domain range of an OFDM symbol, the HARQ-ACK modulation symbols are sequentially mapped to the REs of the next OFDM symbol.

In one or more embodiments, the first mapping module 92 may include:

a division submodule 923, configured to divide the HARQ-ACK modulation symbols into P symbol groups, each symbol group including at most N HARQ-ACK modulation symbols;

a third mapping submodule 924, configured to map each of HARQ-ACK modulation symbols of a first group of HARQ-ACK modulation symbols to different REs at a frequency-domain position where the starting position is;

a fourth determination submodule 925, configured to determine a frequency-domain position that each group of HARQ-ACK modulation symbols in remaining groups of HARQ-ACK modulation symbols are mapped to based on the frequency-domain position where the starting position is and the frequency-domain offset; and a fourth mapping submodule 926, configured to map the remaining groups of HARQ-ACK modulation symbols to different REs at the frequency-domain positions of the corresponding groups in a time-domain-first manner.

In one or more embodiments, the device further may include:

a second determination module 93, configured to, in response to CSI, the HARQ-ACK information and the uplink data being multiplexed in transmission, preferably determine REs that CSI modulation symbols are mapped to, and a third determination module 94, configured to determine REs other than the REs that the CSI modulation symbols are mapped to as mappable REs for the HARQ-ACK modulation symbols, or determine REs other than OFDM symbols including the REs that the CSI modulation symbols are mapped to as the mappable REs for the HARQ-ACK modulation symbols; and the first mapping module 92 may include:

a tenth mapping submodule 934, configured to map the HARQ-ACK modulation symbols to REs in mappable symbols according to the starting position and the frequency-domain offset.

In one or more embodiments, the device further may include:

a fourth determination module 95, configured to determine REs other than the REs that the HARQ-ACK modulation symbols are mapped to as mappable REs for the CSI modulation symbols; and a second mapping module 96, configured to map the CSI modulation symbols to the mappable REs for the CSI modulation symbols according to a preset mapping configuration.

FIG. 11 is a block diagram of another physical-layer resource mapping device according to an example. As shown in FIG. 11, based on the embodiment shown in FIG. 9 or FIG. 10, in one or more embodiments, the first determination module 91 includes:

a fifth determination submodule 914, configured to determine the frequency-domain offset based on the number K of the REs occupied by the HARQ-ACK modulation symbols and the number M of the REs in each OFDM symbol.

In one or more embodiments, the first mapping module 92 may include:

a fifth mapping submodule 927, configured to map, from a RE where the starting position is, Q HARQ-ACK modulation symbols to different REs at the same frequency-domain position in a time-domain-first manner, and then offset the HARQ-ACK modulation symbols based on the frequency-domain offset, and then map next Q HARQ-ACK modulation symbols to different REs, Q being calculated based on K and M.

In one or more embodiments, the first determination module 91 may include:

a sixth determination submodule 915, configured to, in response to that K is not greater than M, determine a first frequency-domain offset corresponding to the first R HARQ-ACK modulation symbols by a first algorithm and determine a second frequency-domain offset corresponding to the HARQ-ACK modulation symbols other than the first R HARQ-ACK modulation symbols by a second algorithm, R being calculated based on a third algorithm, K being the number K of the REs occupied by the HARQ-ACK modulation symbols and M being the number of the REs in each OFDM symbol; and a seventh determination submodule 916, configured to, in response to that K is greater than M, determine a first count corresponding to REs that the HARQ-ACK modulation symbols are mapped to at each frequency-domain position during first S offsetting of the HARQ-ACK modulation symbols by a fourth algorithm and determine a second count corresponding to REs that the HARQ-ACK modulation symbols are mapped to at each frequency-domain position during offsetting of the HARQ-ACK modulation symbols other than first S offsetting by a fifth algorithm, S being calculated based on a sixth algorithm, a frequency-domain offset corresponding to first S offsetting being a first preset value and a frequency-domain offset corresponding to frequency-domain offsetting other than first S offsetting being a second set value.

In one or more embodiments, the first mapping module 92 may include:

a sixth mapping submodule 928, configured to, in response to that K is not greater than M, map the first R HARQ-ACK modulation symbols in a time-domain-first manner to different REs at different frequency-domain positions from the starting position one by one according to the first frequency-domain offset;

an eighth determination submodule 929, configured to determine an RE that an (R+1)th HARQ-ACK modulation symbol is mapped to based on a frequency-domain position of an Rth HARQ-ACK modulation symbol and the second frequency-domain offset; and a seventh mapping submodule 930, configured to map the HARQ-ACK modulation symbols other than the first R HARQ-ACK modulation symbols in a time-domain-first manner to different REs at different frequency-domain positions starting from the RE that the (R+1)th HARQ-ACK modulation symbol is mapped to one by one according to the second frequency-domain offset.

In one or more embodiments, the first mapping module 92 may include:

an eighth mapping submodule 931, configured to, in response to that K is greater than M, perform, in a time-domain-first manner, first S frequency-domain offsetting starting from the frequency-domain position where the starting position is according to the first preset value and continuously map the first count of HARQ-ACK modulation symbols at each frequency-domain position;

a ninth determination submodule 932, configured to determine, based on the frequency-domain position where the starting position is, the first preset value and the second set value, a starting position of (S+1)th offsetting; and a ninth mapping submodule 933, configured to, after first S offsetting is completed, perform, in a time-domain-first manner frequency-domain offsetting starting from the starting position of (S+1)th offsetting according to the first preset value and continuously map the second count of HARQ-ACK modulation symbols at each frequency-domain position.

Figure 12:
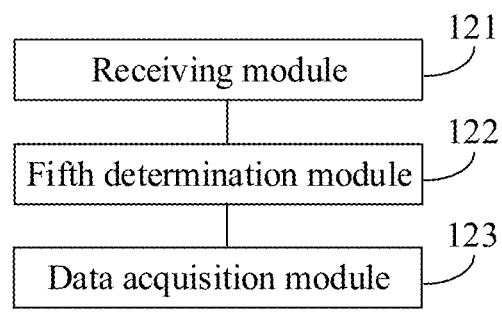
FIG. 12 is a block diagram of a physical-layer resource mapping device according to an example.

FIG. 12 is a block diagram of a physical-layer resource mapping device according to an example. The physical-layer resource mapping device is applied to a base station. As shown in FIG. 12, the physical-layer resource mapping device 12 includes:

a receiving module 121, configured to receive coded data including HARQ-ACK modulation symbols and data modulation symbols from UE;

a fifth determination module 122, configured to determine REs including the HARQ-ACK modulation symbols and REs including the data modulation symbols based on a starting position and a frequency-domain offset for each of physical-layer resources that each HARQ-ACK modulation symbol is mapped to, the frequency-domain offset being for one of REs that different HARQ-ACK modulation symbols are mapped to; and a data acquisition module 123, configured to acquire HARQ-ACK information and uplink data based on the REs including the HARQ-ACK modulation symbols and the REs including the data modulation symbols.

In one or more embodiments, the starting position of the physical-layer resources that HARQ-ACK modulation symbols mapped to is a lowest frequency-domain position of an orthogonal frequency division multiplexing (OFDM) symbol next to a demodulation reference signal (DMRS) of the uplink data; or, the starting position of the physical-layer resources that HARQ-ACK modulation symbols mapped to is a lowest frequency-domain position of a first OFDM symbol other than a DMRS of the uplink data.

In one or more embodiments, the frequency-domain offset of each HARQ-ACK modulation symbol mapped to the physical-layer resource may be obtained based on the number K of the REs occupied by the HARQ-ACK modulation symbols and the number M of REs in each OFDM symbol.

In one or more embodiments, the frequency-domain offset of each HARQ-ACK modulation symbol mapped to the physical-layer resource may be obtained based on the number N of OFDM symbols mappable for the HARQ-ACK modulation symbols, the number K of the REs occupied by the HARQ-ACK modulation symbols and the number M of the REs in each OFDM symbol.

With respect to the devices in the above embodiments, the specific manners for performing operations for individual modules therein have been described in detail in the embodiment regarding the method, which will not be elaborated herein.

Figure 13:
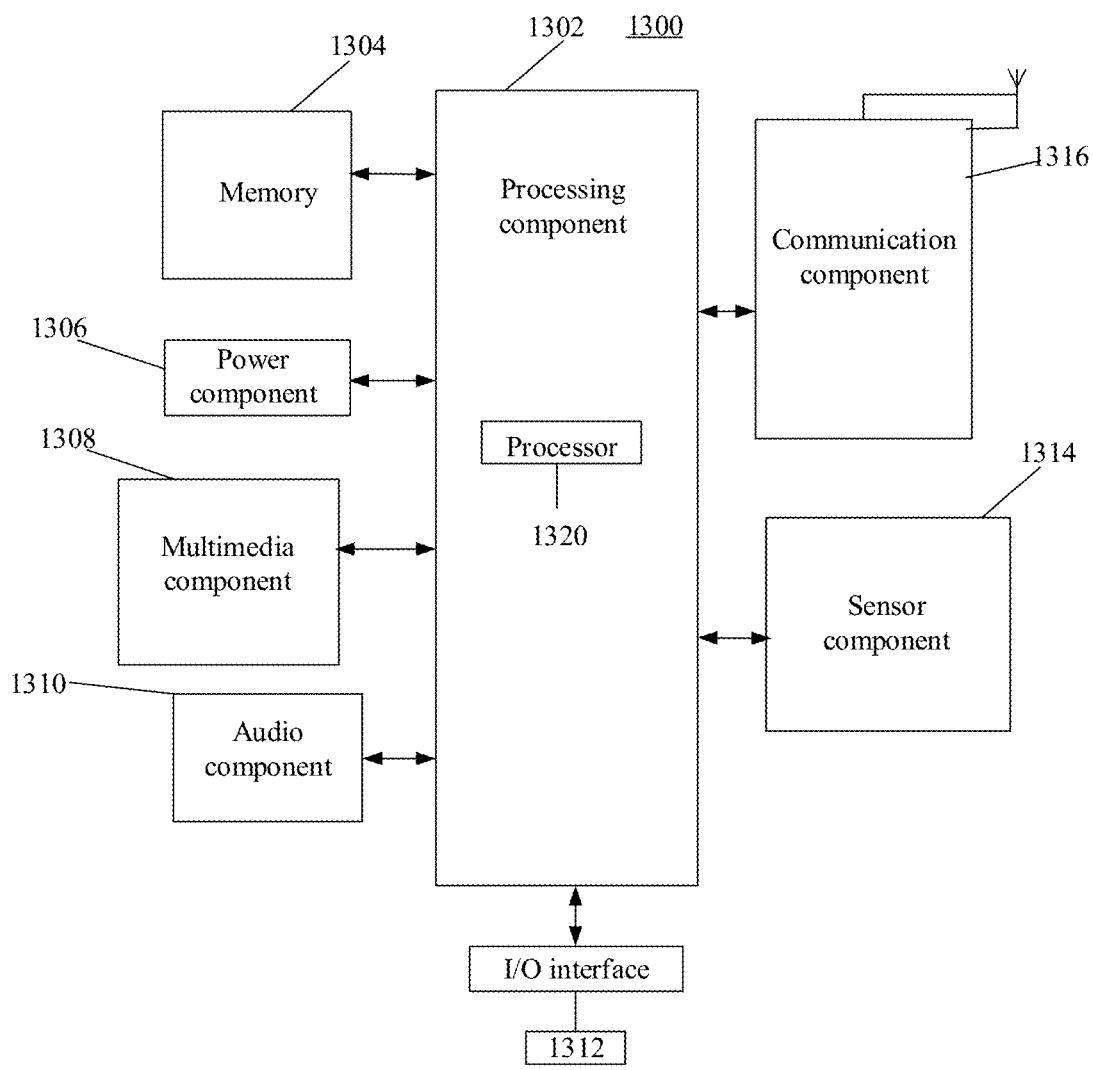
FIG. 13 is a block diagram of a device applied to physical-layer resource mapping according to an example.

FIG. 13 is a block diagram of a device applied to physical-layer resource mapping according to an example. For example, the device 1300 may be UE such as a mobile phone, a computer, a digital broadcast terminal, a messaging device, a gaming console, a tablet, a medical device, exercise equipment and a personal digital assistant. The device 1300 may be a receiver and may also be a sender.

Referring to FIG. 13, the device 1300 may include one or more of the following components: a processing component 1302, a memory 1304, a power component 1306, a multimedia component 1308, an audio component 1312, an Input/Output (I/O) interface 1312, a sensor component 1314, and a communication component 1316.

The processing component 1302 is typically configured to control overall operations of the device 1300, such as the operations associated with display, telephone calls, data communications, camera operations, and recording operations. The processing component 1302 may include one or more processors 1320 to execute instructions to perform all or part of the steps in the abovementioned method. Moreover, the processing component 1302 may include one or more modules which facilitate interaction between the processing component 1302 and the other components. For instance, the processing component 1302 may include a multimedia module to facilitate interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1306 is configured to provide power for various components of the device 1300. The power component 1306 may include a power management system, one or more power supplies, and other components associated with generation, management and distribution of power for the device 1300.

The multimedia component 1308 may include a screen providing an output interface between the device 1300 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1308 includes a front camera and/or a rear camera. The front camera and/or the rear camera may receive external multimedia data when the device 1300 is in an operation mode, such as a photographing mode or a video mode. Each of the front camera and the rear camera may be a fixed optical lens system or have focusing and optical zooming capabilities.

The audio component 1312 is configured to output and/or input an audio signal. For example, the audio component 1312 includes a Microphone (MIC), and the MIC is configured to receive an external audio signal when the device 1300 is in the operation mode, such as a call mode, a recording mode and a voice recognition mode. The received audio signal may further be stored in the memory 1304 or sent through the communication component 1316. In some embodiments, the audio component 1312 further includes a speaker configured to output the audio signal.

The I/O interface 1312 may provide an interface between the processing component 1302 and a peripheral interface module, and the peripheral interface module may be a keyboard, a click wheel, a button and the like. The button may include, but not limited to: a home button, a volume button, a starting button and a locking button.

The sensor component 1314 may include one or more sensors configured to provide status assessment in various aspects for the device 1300. For instance, the sensor component 1314 may detect an on/off status of the device 1300 and relative positioning of components, such as a display and small keyboard of the device 1300, and the sensor component 1314 may further detect a change in a position of the device 1300 or a component of the device 1300, presence or absence of contact between the user and the device 1300, orientation or acceleration/deceleration of the device 1300 and a change in temperature of the device 1300. The sensor component 1314 may include a proximity sensor configured to detect presence of an object nearby without any physical contact. The sensor component 1314 may also include a light sensor, such as a Complementary Metal Oxide Semiconductor (CMOS) or Charge Coupled Device (CCD) image sensor, configured for use in an imaging application. In some embodiments, the sensor component 1314 may also include an acceleration sensor, a gyroscope sensor, a magnetic sensor, a pressure sensor or a temperature sensor.

The communication component 1316 is configured to facilitate wired or wireless communication between the device 1300 and another device. The device 1300 may access a communication-standard-based wireless network, such as a Wireless Fidelity (WiFi) network, a 2nd-Generation (2G) or 3rd-Generation (3G) network or a combination thereof. In an example, the communication component 1316 receives a broadcast signal or broadcast associated information from an external broadcast management system through a broadcast channel. In an example, the communication component 1316 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an example, the device 1300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method described according to the first aspect.

In an example, there is also provided a non-transitory computer-readable storage medium including instructions, such as the memory 1304 including instructions, and the instruction may be executed to configure the processor 1320 of the device 1300 to execute the method described according to the first aspect.

Figure 14:
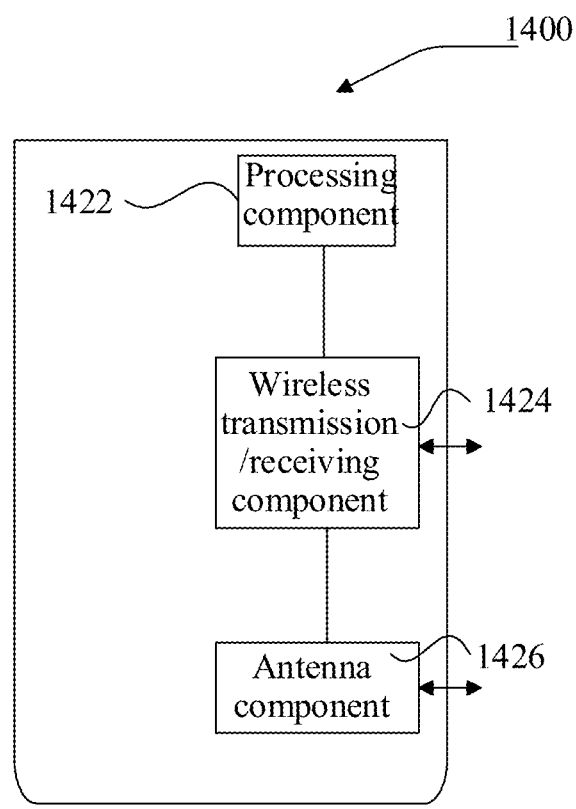
FIG. 14 is a block diagram of a device applied to physical-layer resource mapping according to an example.

FIG. 14 is a block diagram of a device applied to physical-layer resource mapping according to an example. The device 1400 may be provided as a base station. Referring to FIG. 14, the device 1400 includes a processing component 1422, a wireless transmission/receiving component 1424, an antenna component 1426 and a wireless interface-specific signal processing part, and the processing component 1422 may further include one or more processors.

One processor in the processing component 1422 may be configured to execute the method described according to the second aspect.

In an example, a non-transitory computer-readable storage medium including instructions is also provided in a base station, in which computer instructions are stored, the instructions being executed by a processor to implement the method described according to the second aspect.

Other implementation solutions of the present disclosure will be apparent to those skilled in the art from consideration of the specification and practice of the present disclosure. This present application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A physical-layer resource mapping method, implemented by user equipment (UE), the method comprising:
   during multiplexing transmission of hybrid automatic repeat request acknowledgement (HARQ-ACK) information and uplink data, determining a frequency-domain offset and a starting position for each of physical-layer resources that a HARQ-ACK modulation symbol is mapped to, wherein the frequency-domain offset is for identifying one of a plurality of resource elements (REs) that different HARQ-ACK modulation symbols are mapped to; and
   mapping each HARQ-ACK modulation symbol to a corresponding RE according to the starting position and the frequency-domain offset.

2. The method of claim 1, wherein determining the frequency-domain offset and the starting position for each of physical-layer resources that the HARQ-ACK modulation symbol is mapped to comprises:
   determining a lowest frequency-domain position of an orthogonal frequency division multiplexing (OFDM) symbol next to a demodulation reference signal (DMRS) of the uplink data as the starting position; or,
   determining a lowest frequency-domain position of a first OFDM symbol other than a DMRS of the uplink data as the starting position.

3. The method of claim 1, wherein determining the frequency-domain offset and the starting position for each of physical-layer resources that the HARQ-ACK modulation symbol is mapped to comprises:
   determining the frequency-domain offset for each of REs based on the number N of OFDM symbols mappable for the HARQ-ACK modulation symbols, the number K of REs occupied by the HARQ-ACK modulation symbols and the number M of REs in each OFDM symbol.

4. The method of claim 3, wherein mapping each HARQ-ACK modulation symbol to the corresponding RE according to the starting position and the frequency-domain offset comprises:
   mapping a first HARQ-ACK modulation symbol to an RE where the starting position is; and
   mapping, in a frequency-domain-first manner, each of remaining HARQ-ACK modulation symbols to different REs according to the frequency-domain offset for each of the remaining HARQ-ACK modulation symbols.

5. The method of claim 4, the method further comprising:
in response to the frequency-domain offset exceeding a frequency-domain range of an OFDM symbol, mapping the remaining HARQ-ACK modulation symbols to REs of a next OFDM symbol sequentially.

6. The method of claim 3, wherein mapping each HARQ-ACK modulation symbol to the corresponding RE according to the starting position and the frequency-domain offset comprises:
   dividing the HARQ-ACK modulation symbols into P symbol groups, wherein each symbol group comprises at most N HARQ-ACK modulation symbols;
   mapping each of HARQ-ACK modulation symbols in a first group of HARQ-ACK modulation symbols to different REs at a frequency-domain position where the starting position is;
   determining a frequency-domain position, to which each group of HARQ-ACK modulation symbols in remaining groups of HARQ-ACK modulation symbols are mapped, based on the frequency-domain position where the starting position is and the frequency-domain offset; and
   mapping, in a time-domain-first manner, the remaining groups of HARQ-ACK modulation symbols to different REs at frequency-domain positions of corresponding groups.

7. The method of claim 1, wherein determining the frequency-domain offset for each of physical-layer resources that the HARQ-ACK modulation symbol is mapped to comprises: determining the frequency-domain offset based on the number K of REs occupied by the HARQ-ACK modulation symbols and the number M of REs in each OFDM symbol.

8. The method of claim 7, wherein mapping each HARQ-ACK modulation symbol to the corresponding RE according to the starting position and the frequency-domain offset comprises:
   mapping, in a time-domain-first manner, Q HARQ-ACK modulation symbols to different REs being with the same frequency-domain position, wherein the REs start from a frequency-domain position where the starting position is, then offsetting the Q HARQ-ACK modulation symbols based on the frequency-domain offset, and then mapping next Q HARQ-ACK modulation symbols to different REs, wherein Q is calculated based on K and M.

9. The method of claim 1, wherein determining the frequency-domain offset for each of physical-layer resources that the HARQ-ACK modulation symbol is mapped to comprises:
   in a case that K is not greater than M, determining a first frequency-domain offset corresponding to first R HARQ-ACK modulation symbols by a first algorithm, and determining a second frequency-domain offset corresponding to remaining HARQ-ACK modulation symbols other than the first R HARQ-ACK modulation symbols by a second algorithm, wherein R is calculated based on a third algorithm, K is the number K of REs occupied by the HARQ-ACK modulation symbols and M is the number of REs in each OFDM symbol; or
   in a case that K is greater than M, determining, by a fourth algorithm, a first count corresponding to REs that the HARQ-ACK modulation symbols are mapped to at each frequency-domain position during first S offsetting of the HARQ-ACK modulation symbols, and determining, by a fifth algorithm, a second count corresponding to REs that the HARQ-ACK modulation symbols are mapped to at each frequency-domain position during offsetting of remaining HARQ-ACK modulation symbols other than the first S offsetting, wherein S is calculated based on a sixth algorithm, a frequency-domain offset corresponding to the first S offsetting is a first preset value, and a frequency-domain offset corresponding to frequency-domain offsetting other than the first S offsetting is a second set value.

10. The method of claim 9, wherein mapping each HARQ-ACK modulation symbol to the corresponding RE according to the starting position and the frequency-domain offset comprises:
   in a case that K is not greater than M, mapping, in a time-domain-first manner, each of the first R HARQ-ACK modulation symbols to different REs being with the same frequency-domain position according to the first frequency-domain offset, wherein the REs start from a frequency-domain position where the starting position is;
   determining an RE that an (R+1)th HARQ-ACK modulation symbol is mapped to based on a frequency-domain position of an Rth HARQ-ACK modulation symbol and the second frequency-domain offset; and
   mapping, in a time-domain-first manner, each of remaining HARQ-ACK modulation symbols other than the first R HARQ-ACK modulation symbols to different REs at different frequency-domain positions starting from the RE, that the (R+1)th HARQ-ACK modulation symbol is mapped to, according to the second frequency-domain offset.

11. The method of claim 9, wherein mapping each HARQ-ACK modulation symbol to the corresponding RE according to the starting position and the frequency-domain offset comprises:
   in a case that K is greater than M, performing, in a time-domain-first manner, the first S frequency-domain offsetting starting from the frequency-domain position where the starting position is according to the first preset value, and continuously mapping the first count of HARQ-ACK modulation symbols at each frequency-domain position;
   based on the frequency-domain position where the starting position is, the first preset value and the second set value, determining a starting position of (S+1)th offsetting; and
   after completing the first S offsetting, performing, in a time-domain-first manner, frequency-domain offsetting starting from the starting position of (S+1)th offsetting according to the first preset value, and continuously mapping the second count of HARQ-ACK modulation symbols at each frequency-domain position.

12. The method of claim 1, further comprising:
   during multiplexing transmission of Channel State Information (CSI), the HARQ-ACK information, and the uplink data, determining REs that CSI modulation symbols are mapped to; and determining REs, other than the REs that the CSI modulation symbols are mapped to, as mappable REs for the HARQ-ACK modulation symbols, or determining REs, other than OFDM symbols comprising the REs that the CSI modulation symbols are mapped to, as mappable REs for the HARQ-ACK modulation symbols, wherein the mapping each HARQ-ACK modulation symbol to a corresponding RE according to the starting position and the frequency-domain offset comprises:

mapping the HARQ-ACK modulation symbols to the mappable REs according to the starting position and the frequency-domain offset.

13. The method of claim 1, during multiplexing transmission of CSI, the HARQ-ACK information, and the uplink data, after mapping each HARQ-ACK modulation symbol to the corresponding RE, the method further comprising:

determining REs, other than the REs that the HARQ-ACK modulation symbols are mapped to, as mappable REs for CSI modulation symbols; and mapping the CSI modulation symbols to the mappable REs for the CSI modulation symbols according to a preset mapping rule.

14. A physical-layer resource mapping method, implemented by a base station, the method comprising:

receiving coded data from user equipment (UE), wherein the coded data comprises hybrid automatic repeat request acknowledgement (HARQ-ACK) modulation symbols and data modulation symbols;

determining resource elements (REs) comprising the HARQ-ACK modulation symbols and REs comprising the data modulation symbols based on a starting position and a frequency-domain offset for each of physical-layer resources that a HARQ-ACK modulation symbol is mapped to, wherein the frequency-domain offset is for identifying one of a plurality of REs that different HARQ-ACK modulation symbols are mapped to; and acquiring HARQ-ACK information and uplink data based on the REs comprising the HARQ-ACK modulation symbols and the REs comprising the data modulation symbols.

15. The method of claim 14, wherein the starting position of the physical-layer resources that HARQ-ACK modulation symbols mapped to is a lowest frequency-domain position of an orthogonal frequency division multiplexing (OFDM) symbol next to a demodulation reference signal (DMRS) of the uplink data; or, the starting position of the physical-layer resources that HARQ-ACK modulation symbols mapped to is a lowest frequency-domain position of a first OFDM symbol other than a DMRS of the uplink data.

16. The method of claim 14, wherein the frequency-domain offset is obtained based on the number K of the REs occupied by the HARQ-ACK modulation symbols and the number M of REs in each OFDM symbol.

17. The method of claim 14, wherein the frequency-domain offset is obtained based on the number N of OFDM symbols mappable for the HARQ-ACK modulation symbols, the number K of the REs occupied by the HARQ-ACK modulation symbols and the number M of the REs in each OFDM symbol.

18. User equipment (UE), comprising:

a processor; and a memory configured to store instructions executable by the processor, wherein the processor is configured to:

during multiplexing transmission of hybrid automatic repeat request acknowledgement (HARQ-ACK) information and uplink data, determine a frequency-domain offset and a starting position for each of physical-layer resources that a HARQ-ACK modulation symbol is mapped to, wherein the frequency-domain offset is for identifying one of a plurality of resource elements (REs) that different HARQ-ACK modulation symbols are mapped to; and map each HARQ-ACK modulation symbol to a corresponding REs according to the starting position and the frequency-domain offset.

* * * * *